United States Patent
Noguchi et al.

(10) Patent No.: US 8,234,467 B2
(45) Date of Patent: Jul. 31, 2012

(54) STORAGE MANAGEMENT DEVICE, STORAGE SYSTEM CONTROL DEVICE, STORAGE MEDIUM STORING STORAGE MANAGEMENT PROGRAM, AND STORAGE SYSTEM

(75) Inventors: Yasuo Noguchi, Kawasaki (JP);
Kazutaka Ogihara, Kawasaki (JP);
Masahisa Tamura, Kawasaki (JP);
Yoshihiro Tsuchiya, Kawasaki (JP);
Tetsutaro Maruyama, Kawasaki (JP);
Takashi Watanabe, Kawasaki (JP);
Tatsuo Kumano, Kawasaki (JP);
Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 12/268,848

(22) Filed: Nov. 11, 2008

(65) Prior Publication Data

US 2009/0150629 A1 Jun. 11, 2009

(30) Foreign Application Priority Data

Dec. 5, 2007 (JP) ................................ 2007-314706

(51) Int. Cl.
*G06F 12/00* (2006.01)
(52) U.S. Cl. ......................................... 711/162; 714/42
(58) Field of Classification Search .................. 711/162; 714/42
See application file for complete search history.

(56) References Cited

U.S. PATENT DOCUMENTS

| | | | |
|---|---|---|---|
| 5,241,669 A | | 8/1993 | Cohn |
| 5,615,329 A | * | 3/1997 | Kern et al. .................... 714/6.12 |
| 7,761,680 B2 | * | 7/2010 | Ash et al. ....................... 711/165 |
| 2002/0103980 A1 | | 8/2002 | Crockett |
| 2005/0097402 A1 | | 5/2005 | Baba |
| 2005/0166086 A1 | * | 7/2005 | Watanabe ......................... 714/6 |
| 2005/0210193 A1 | | 9/2005 | Nagata |
| 2005/0210210 A1 | * | 9/2005 | Arai et al. ....................... 711/162 |
| 2006/0080319 A1 | | 4/2006 | Hickman et al. |
| 2006/0253569 A1 | | 11/2006 | Tamura et al. |
| 2009/0089508 A1 | * | 4/2009 | Trika et al. ..................... 711/135 |

FOREIGN PATENT DOCUMENTS

| | | |
|---|---|---|
| EP | 1 494 118 | 1/2005 |
| EP | 1 662 392 | 5/2006 |
| JP | A 10-198602 | 7/1998 |
| JP | A 2005-4681 | 1/2005 |
| JP | A 2005-165702 | 6/2005 |
| JP | A 2005-275525 | 10/2005 |
| WO | WO 03/090089 A1 | 10/2003 |
| WO | WO 2004/027625 A1 | 4/2004 |

* cited by examiner

*Primary Examiner* — Hashem Farrokh
(74) *Attorney, Agent, or Firm* — Greer, Burns & Crain, Ltd.

(57) ABSTRACT

A storage management device includes a management unit for managing a storage device assigned thereto and a temporary storage unit assigned thereto. The management unit comprises a backup unit for, when data is written into the storage device, storing the data in the previously assigned temporary storage unit before the writing of the data into the storage device is completed, and a take-over unit for, when data which is already stored in the temporary storage unit, but which is not yet written into the storage device exists when the storage device and the temporary storage unit are assigned, writing the not-yet-written data into the storage device.

16 Claims, 23 Drawing Sheets

FIG. 5

CONNECTION STATE TABLE 510

| STORAGE NODE NAME | STORAGE NAME | CACHE DEVICE NAME |
|---|---|---|
| SN-A | DISK-A | CACHE-A |
| SN-B | DISK-B | CACHE-B |
| SN-C | DISK-C | CACHE-C |
| SN-D | DISK-D | CACHE-D |
| ... | ... | ... |

FIG. 9A
CONNECTION STATE TABLE 520

| STORAGE NODE NAME | STORAGE NAME | CACHE DEVICE NAME |
|---|---|---|
| SN-A | DISK-A | CACHE-A |
| SN-B | DISK-B | CACHE-B |
| SN-C | DISK-C | CACHE-C |
| SN-D | DISK-D | CACHE-D |

⋮ ⋮ ⋮

FIG. 9B
CONNECTION STATE TABLE 530

| STORAGE NODE NAME | STORAGE NAME | CACHE DEVICE NAME |
|---|---|---|
| SN-C | DISK-A | CACHE-A |
| SN-B | DISK-B | CACHE-B |
| SN-C | DISK-C | CACHE-C |
| SN-D | DISK-D | CACHE-D |

⋮ ⋮ ⋮

CONNECTION STATE TABLE 540

CONNECTION STATE TABLE 550

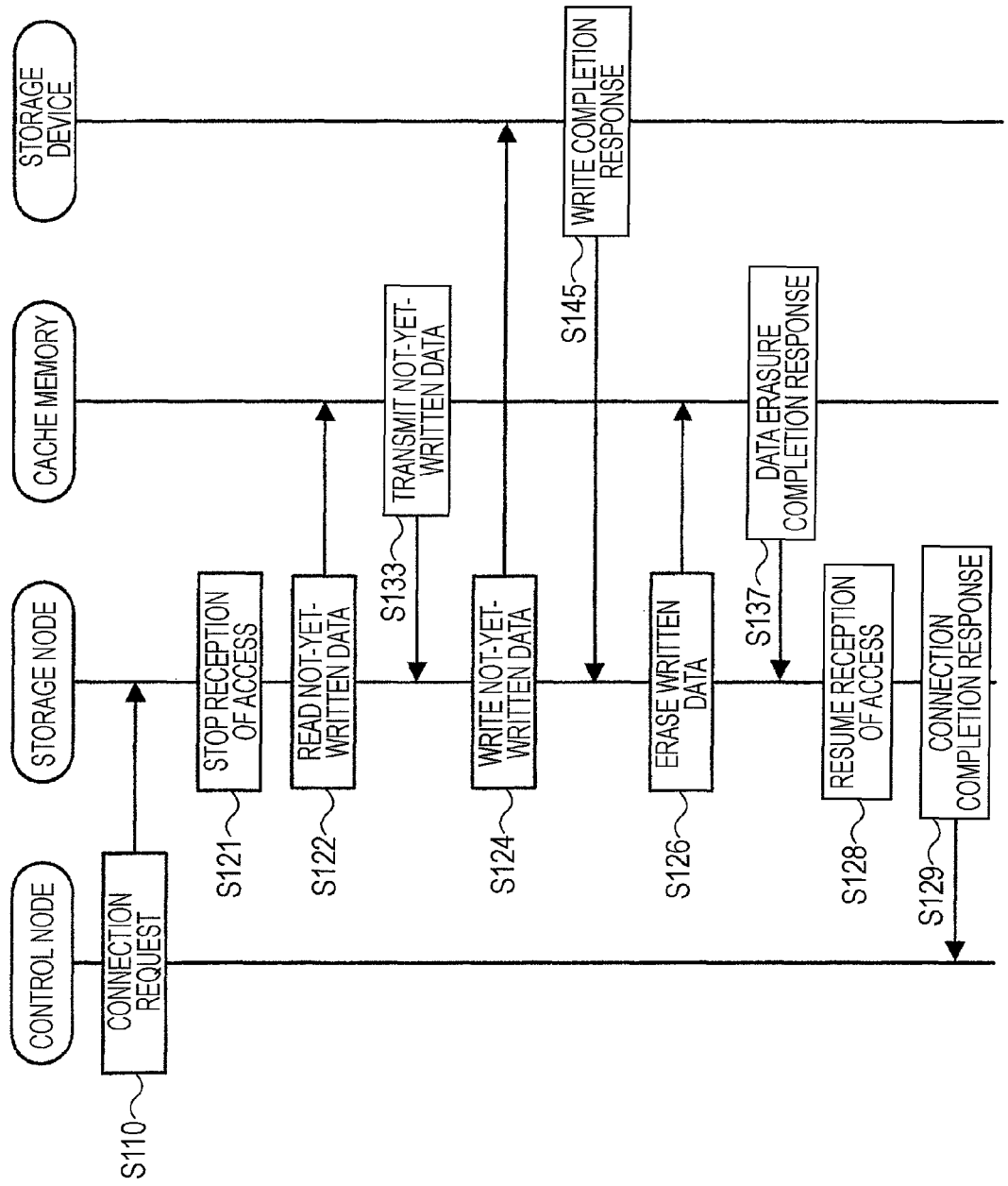

FIG. 22A

CONNECTION STATE TABLE 560

| STORAGE NODE NAME | STORAGE NAME | CACHE DEVICE NAME |
|---|---|---|
| SN-A | LU-A-1 | CACHE-B |
| SN-A | LU-B-2 | CACHE-B |
| ⋮ | ⋮ | ⋮ |
| SN-C | LU-B-4 | CACHE-D |
| SN-C | LU-C-1 | CACHE-D |
| ⋮ | ⋮ | ⋮ |

FIG. 22B

CONNECTION STATE TABLE 570

| STORAGE NODE NAME | STORAGE NAME | CACHE DEVICE NAME |
|---|---|---|
| ⋮ | ⋮ | ⋮ |
| SN-C | LU-A-1 | CACHE-B |
| SN-C | LU-B-2 | CACHE-B |
| SN-C | LU-B-4 | CACHE-D |
| SN-C | LU-C-1 | CACHE-D |
| ⋮ | ⋮ | ⋮ |

STORAGE MANAGEMENT DEVICE, STORAGE SYSTEM CONTROL DEVICE, STORAGE MEDIUM STORING STORAGE MANAGEMENT PROGRAM, AND STORAGE SYSTEM

CROSS-REFERENCE TO RELATED APPLICATIONS

This application is related to and claims the benefit of priority from Japanese Patent Application No. 2007-314706, filed on Dec. 5, 2007, the entire contents of which are incorporated herein by reference.

BACKGROUND OF THE INVENTION

Field of the Invention

The present invention relates to a storage management device, a storage system control device, a storage medium storing a storage management program, and a storage system.

SUMMARY OF THE INVENTION

In keeping with one aspect of the present invention, there is provided a storage management device for a storage system, that stores data in a plurality of storage devices interconnected via a network in a distributed manner. The storage management device includes a management unit for managing the storage device assigned thereto, and a temporary storage unit assigned thereto. The management unit has a backup unit for, when the data is written into the storage device, storing the data in the previously assigned temporary storage unit before the writing of the data into the storage device is completed. When data is already stored in the temporary storage unit, but is not yet written into the storage device when the storage device and the temporary storage unit are assigned, a take-over unit writes the not-yet-written data into the storage device.

Additional aspects and/or advantages will be set forth in part in the description which follows and, in part, will be apparent from the description, or may be learned by practice of the invention with reference being had to the accompanying drawings forming a part hereof, wherein like numerals refer to like parts throughout.

BRIEF DESCRIPTION OF THE DRAWINGS

FIG. 5 illustrates the data structure of a connection state table;

FIG. 9A is a table for explaining update of the connection state table when the storage node has failed;

FIG. 9B is a table for explaining the update of the connection state table when the storage node has failed;

FIG. 11 is a sequence chart showing the procedures of an assignment process at startup of the storage system;

FIG. 22A illustrates a connection state table in the exemplary configuration of the storage system according to the embodiment when the storage system is in the usual state;

FIG. 22B illustrates a connection state table in the exemplary configuration of the storage system according to the embodiment when the storage node has failed.

DESCRIPTION OF THE PREFERRED EMBODIMENTS

Figure 1:
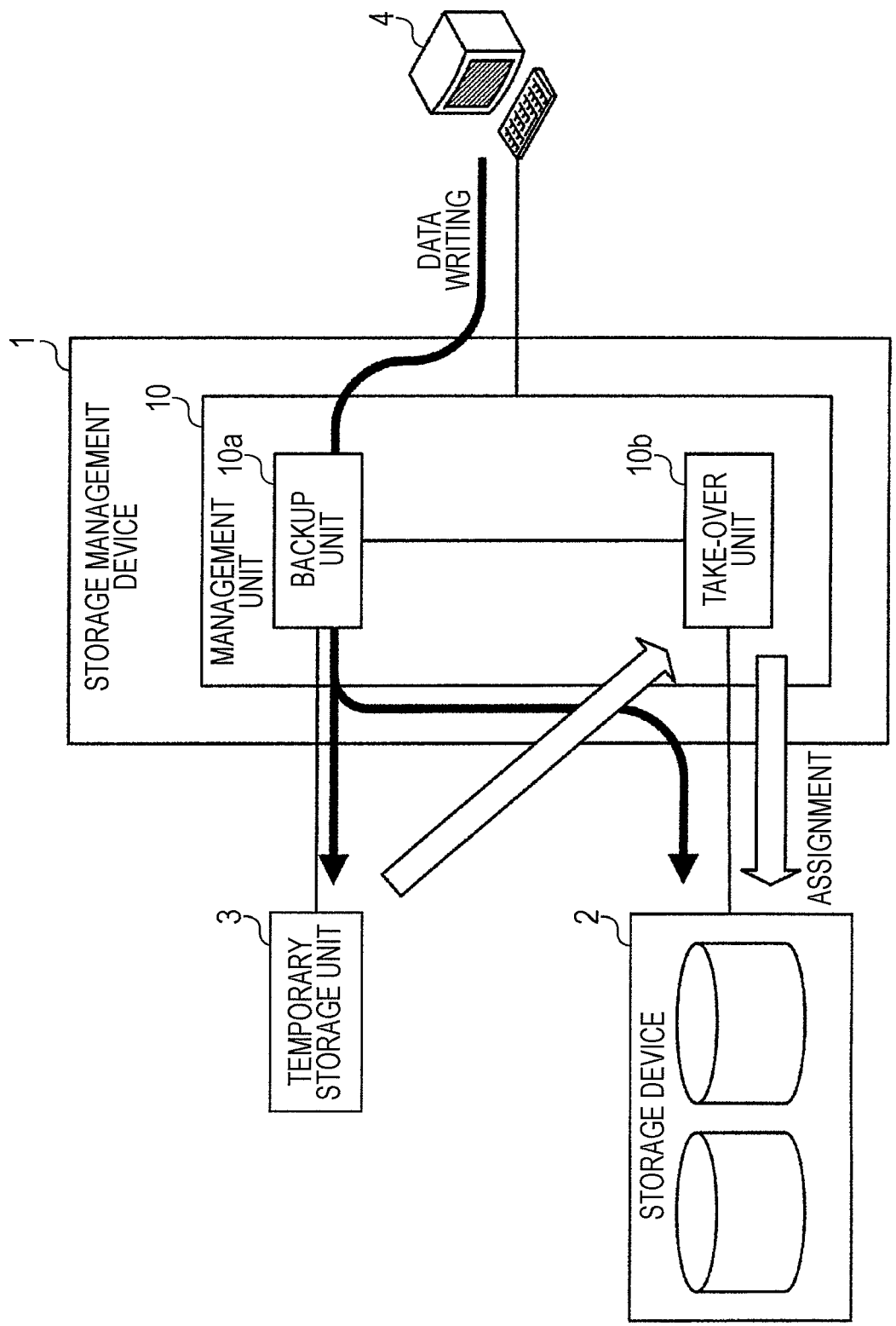
FIG. 1 illustrates the outline of an embodiment.

With the widespread use of data processing employing computers, storage techniques for accumulating and utilizing data have become more important. Hitherto, RAID (Redundant Arrays of Independent Disks) has been generally employed as one storage technique for realizing a higher speed of data access and higher reliability in data storage. According to RAID, data is divided and copied, as required, to be distributed into a plurality of disk devices. Thus, a higher speed is realized with distribution of loads among the plurality of disk devices, and higher reliability is realized with redundancy of data.

Recently, a distributed storage system utilizing the concept of RAID has been constructed to achieve an even higher speed and even higher reliability. The distributed storage system includes a plurality of storage nodes and a network interconnecting the storage nodes. Each storage node manages an associated (corresponding) disk device which is internally or externally disposed, and it has a network communication function. In the distributed storage system, data is distributed and stored in the plurality of storage nodes, whereby an even higher speed and even higher reliability are realized in the entire system.

When data is redundantly stored in a distributed storage system, i.e., when data having the same contents is arranged in a plurality of storage nodes, a failure can occur in any of individual storage nodes in practice.

Regarding a system recovery in the event of such a failure, a distributed storage system in which a logical disk is constituted by a plurality of dual segments and is distributed to a plurality of storage nodes is known. In the known distributed storage system, if one storage node has failed, the data in one of the dual segments which is not destroyed is copied to another storage node so that the dual state is restored (see, e.g., Japanese Unexamined Patent Application Publication No. 2005-4681). Thus, according to the known distributed storage system, because a plurality of segments are distributed to a plurality of storage nodes, a recovery to the dual state after the occurrence of a failure can be performed in parallel in units of plural segments and the recovery can be promptly achieved.

Also, there is known a storage system in which a plurality of storage nodes constitute an interconnected network, and storage areas distributed to the plurality of storage nodes are joined by some storage device into one storage area for access by a host computer. A disk cache is constituted in dual redundancy to increase durability against medium failures (see, e.g., Japanese Unexamined Patent Application Publication No. 2005-165702). According to such a storage system, because the storage nodes are interconnected via the network, each storage node can access another storage node.

Further, in a storage system including a plurality of storage nodes and a control unit for selecting the storage node in use with the intent to even out the frequency of use of each cache memory, it is proposed to constitute a disk cache in the control unit in dual redundancy to prevent loss of data not yet reflected on a disk device (see, e.g., Japanese Unexamined Patent Application Publication No. 2005-275525).

With a further known technique, a disk control device includes plural systems of cache memories which are independent of one another. Backup data of an updated disk, not-yet-updated data, and backup data of the not-yet-updated data are loaded into the respective systems of cache memories such that the not-yet-updated data in the cache memory can be restored (see, e.g., Japanese Unexamined Patent Application Publication No. 10-198602).

In the storage node using the multi-node storage such as described in Japanese Unexamined Patent Application Publication No. 2005-4681, however, a storage device (disk) and a control unit for controlling the storage device are integrated with each other. Also, the known storage node is generally constructed such that a disk array device based on, e.g., a RAID system, is used as a disk, a computer, e.g., a PC server, is used as a control server, and the disk array device and the PC server are fixedly interconnected by, e.g., SCSI (Small Computer System Interface) connection.

In the above-described configuration, if the control server has failed, a client cannot access data in the storage device in spite of the storage device being normal. Accordingly, data needs to be stored in dual redundancy by using the method disclosed in Japanese Unexamined Patent Application Publication No. 2005-4681, for example, so that the system can be recovered in the event of a failure of the control unit.

However, storing the data in dual redundancy increases the cost of the multi-node storage. Another problem is that, when a recovery is performed, the system performance is reduced during the recovery.

Recently, with development of a highly reliable technique represented by RAID6, for example, the disk array technology of RAID or the like has become sufficiently reliable even in the single form without needing dual redundancy. Instead of fixedly connecting the storage device using a disk array to the PC server by the SCSI connection, for example, the storage device can be connected to the PC server via a storage area network using, e.g., a fiber channel or an iSCSI (Internet Small Computer System Interface). With such a configuration, even if the PC server has failed, access to data in the storage device can be continued by connecting the storage device to another PC server which serves as a control unit of another storage node. Thus, reliability can be ensured without needing the dual redundancy and the recovery.

However, data temporarily stored in a memory of one PC server and not yet written into the storage device cannot be taken over to another PC server even with succession of the storage device. All data can be taken over by synchronously writing all the data into the storage device RAID, but the synchronous writing greatly reduces a response time because the completion of the writing is not notified to a client having requested the writing of the data until the writing of the data into the storage device is completed.

In the storage system described in Japanese Unexamined Patent Application Publication No. 2005-165702, if a control unit constituting one storage node has failed, another storage node cannot access a disk in the one storage node. Therefore, even when only the control unit for controlling the disk of the storage node has failed, access to data stored in the disk of the relevant storage node can no longer be performed. Further, while Japanese Unexamined Patent Application Publication No. 2005-165702 describes the disk cache in dual redundancy, only the disk cache in the storage node is constituted in dual redundancy. This causes another problem because if the storage node has failed, all data in the disk cache of the storage node is lost.

In the storage system described in Japanese Unexamined Patent Application Publication No. 2005-275525, an external disk can be connected to the storage control unit. However, if the control unit has failed, access to the external disk is disabled because no countermeasures are taken into account against such an event. Further, as in Japanese Unexamined Patent Application Publication No. 2005-165702, while Japanese Unexamined Patent Application Publication No. 2005-275525 describes the disk cache in dual redundancy in the storage system, only the disk cache in the control unit is constituted in dual redundancy. If the control unit has failed, all data in the disk cache is lost.

In the technique described in Japanese Unexamined Patent Application Publication No. 10-198602, similarly to the above-described related art, the cache memory is just constituted in dual redundancy in a single device. This also causes the problem that, if the single device itself has failed, all data in the cache memory is lost.

An embodiment of the present invention will be described in detail below with reference to the drawings. Firstly the outline of the present invention will be described and thereafter the specific content of the embodiment will be described.

FIG. 1 illustrates the outline of the embodiment. A storage system shown in FIG. 1 distributes and stores data in a plurality of storage devices interconnected via a network. The storage system is constituted by a storage management device 1, a storage device 2, a temporary storage unit (means) 3, and a terminal device 4.

The storage management device 1 manages the storage device 2 and the temporary storage unit 3. The storage management device 1 includes a management unit 10. The management unit 10 includes a backup unit 10a and a take-over unit 10b for managing the storage device 2 previously assigned thereto and the temporary storage unit 3 previously assigned thereto.

When data is written into the storage device 2 in response to a request from the terminal device 4, for example, the backup unit 10a stores the data, which is to be written into the storage device 2, in the previously-assigned temporary storage unit 3 as well before the data transmitted from the terminal device 4 is completely written into the storage device 2. The temporary storage unit 3 is to temporarily store data for backup, and it can be a storage device such as a cache memory.

Assignment of the storage device 2 and the temporary storage unit 3 to the storage management device 1 can be performed in a manual manner in which an administrator appropriately assigns them, or in an automatic manner in which the storage management device 1 itself or another device assigns them according to a particular policy based on, e.g., load balance.

If there is data which is stored in the temporary storage unit 3, but which is not yet written into the storage device 2 when the storage device 2 and the temporary storage unit 3 are newly assigned to the storage management device 1, the take-over unit 10b writes that data into the storage device 2. The take-over unit 10b and the storage management device 1 can realize the above-mentioned process by various methods. In one example of the various methods, after the storage management device 1 has completed writing of data received from the terminal device 4 into the storage device 2, the data stored in the temporary storage unit 3 by the backup unit 10a is erased. With such erasing, data in the progress of writing into the storage device 2, which is set in a corresponding relation to the temporary storage unit 3 by the assignment, is stored in the temporary storage unit 3, whereas the data already reflected is erased. As a result, only the not-yet-reflected data is stored in the temporary storage unit 3. Thereafter, when the storage device 2 and the temporary storage unit 3 are newly assigned, the take-over unit 10b writes the data stored in the temporary storage unit 3 into the storage device 2. In another example, a table is prepared to load data stored in the storage device 2 and the temporary storage unit 3, which correspond to each other by assignment. At the time of new assignment, the table is checked and data stored (updated) in only the temporary storage unit 3 is reflected on the storage device 2. Other suitable methods are also usable.

Thus, with the storage management device 1 described above, when data is written into the storage device 2 in response to a request from the terminal device 4, for example, the backup unit 10a stores the data, which is to be written into the storage device 2, in the previously-assigned temporary storage unit 3 as well, before the data transmitted from the terminal device 4 is completely written into the storage device 2. Also, if there is data which is stored in the temporary storage unit 3, but which is not yet written into the storage device 2 when the storage device 2 and the temporary storage unit 3 are newly assigned to the storage management device 1, the take-over unit 10b writes that data into the storage device 2.

Accordingly, the data not yet written into the storage device 2 in the event of a failure of some storage management device can be passed over to another normal storage management device 1, which is newly assigned, with backup executed by the temporary storage unit 3. The other data already written into the storage device 2 by the failed storage management device can also be passed over to the other normal storage management device 1 by new assignment of the storage device 2 and the temporary storage unit 3.

The present embodiment will be described in detail below with reference to the drawings.

Figure 2:
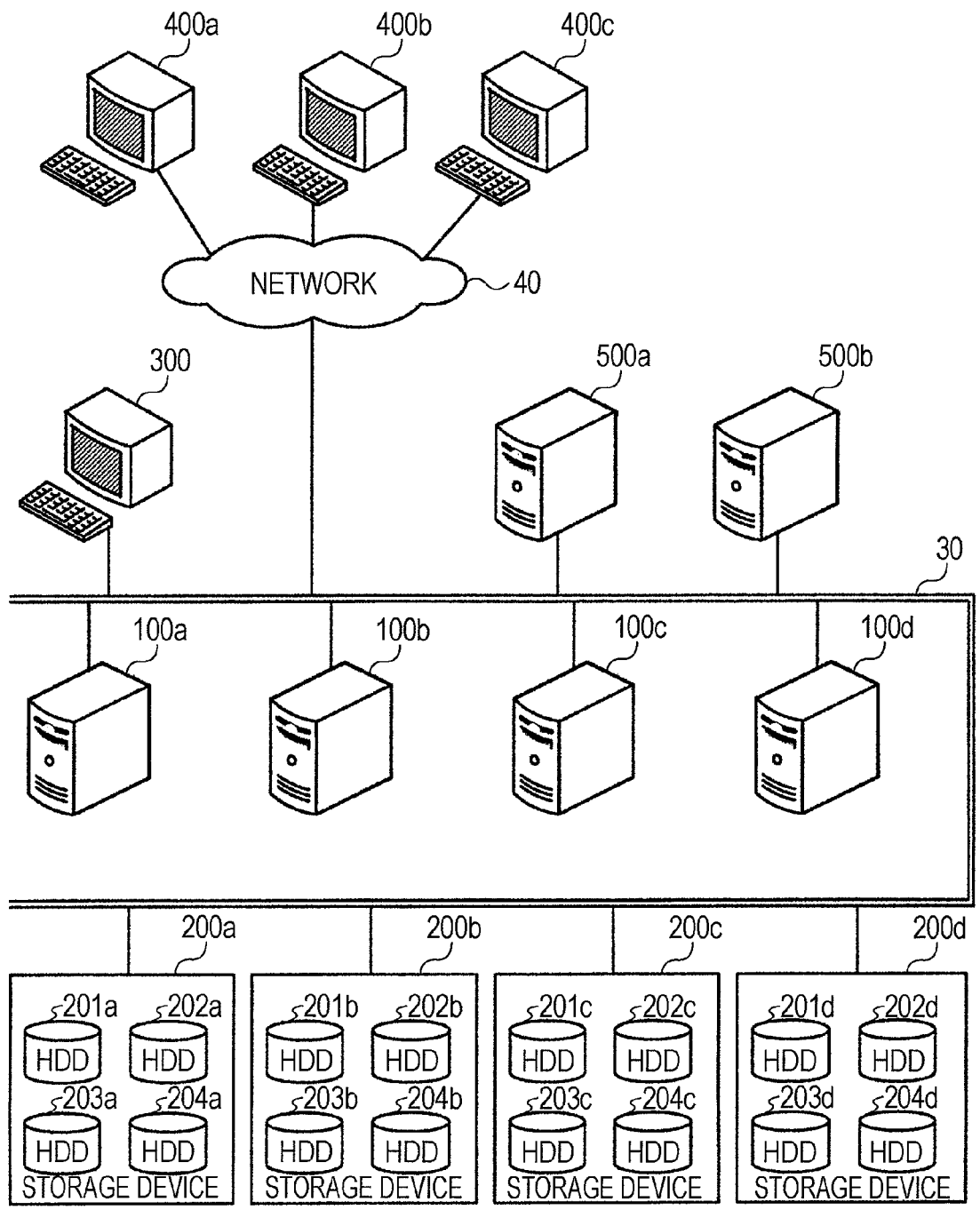
FIG. 2 illustrates the system configuration of the embodiment.

FIG. 2 illustrates the system configuration of the embodiment. A storage system shown in FIG. 2 distributes and stores data in a plurality of storage devices interconnected via a network.

The storage system according to this embodiment includes a plurality (e.g., four) of storage nodes 100a, 100b, 100c and 100d, a plurality (e.g., four) of storage devices 200a, 200b, 200c and 200d, at least one (e.g., two) control nodes 500a and 500b, and at least one (e.g., one) management node 300, which are interconnected via a network 30. At least one terminal device, e.g., three terminal devices 400a, 400b and 400c, are connected to the network 30 via a network 40.

The storage devices 200a to 200d are connected respectively to the storage nodes 100a to 100d via the network 30. The storage nodes 100a to 100d are computers for managing data loaded into the respectively assigned storage devices 200a to 200d and providing the data under the management to the terminal devices 400a to 400c via the networks 30 and 40. Thus, each storage node functions as a storage management device.

Also, the storage nodes 100a to 100d provide, to the terminal devices 400a to 400c, information processing service utilizing data loaded in the storage devices 200a to 200d which are managed respectively by the storage nodes 100a to 100d. More specifically, the storage nodes 100a to 100d execute predetermined programs in response to requests from the terminal devices 400a to 400c via the networks 30 and 40 to thereby perform reading/writing of data and transmission/reception of data in response to requests from the terminal devices 400a to 400c.

Further, though described in detail later, the storage nodes 100a to 100d have respective cache memories (not shown). Each of the cache memories functions as a temporary storage unit which can be assigned to any of other ones of the storage nodes 100a to 100d than the storage node that has the relevant cache memory, and which stores data transmitted from the storage node corresponding to the assigned cache memory and written into any of the storage devices 200a to 200d which is assigned to the storage node corresponding to the assigned cache memory.

In addition, upon receiving data read requests from the terminal devices 400a to 400c via the networks 30 and 40, the storage nodes 100a to 100d read the requested data from respective assigned ones of the storage devices 200a to 200d and then make a response to the terminal devices having transmitted the read requests. Further, upon receiving data write requests from the terminal devices 400a to 400c via the networks 30 and 40, the storage nodes 100a to 100d write the received data into the respective storage devices 200a to 200d and reply to the terminal devices having transmitted the data. Thereafter, the storage nodes 100a to 100d access the storage devices 200a to 200d and the cache memories which are connected to the respective storage nodes via the network 30.

The storage nodes 100a to 100d may provide data redundancy through mirroring such that at least two storage nodes manage the storage devices in different systems, which store the mirrored data having the same contents.

The storage devices 200a to 200d are each a disk array device which is constituted by a plurality of built-in hard disk drives (HDDs) using RAID. HDDs 201a to 204a are incorporated in the storage device 200a. HDDs 201b to 204b are incorporated in the storage device 200b. HDDs 201c to 204c are incorporated in the storage device 200c. HDDs 201d to 204d are incorporated in the storage device 200d. In this embodiment, the storage devices 200a to 200d provide disk management service of RAID5. Only the storage node assigned by the control nodes 500a and 500b can exclusively access corresponding ones of the storage devices 200a to 200d via the networks 30 and 40.

The storage devices 200a to 200d are not limited to RAID5 and they may be constituted by using another type of RAID. As an alternative, a disk array of the storage device may be constituted by using another suitable technique other than RAID. Further, the storage devices 200a to 200d may be each constituted by a single hard disk without using a disk array, or by another suitable storage device.

The control nodes 500a and 500b are computers for managing the storage nodes 100a to 100d and the storage devices 200a to 200d. More specifically, the control nodes 500a and 500b acquire information regarding data management from the storage nodes 100a to 100d and update the information as required.

To increase reliability, the control nodes 500a and 500b are constituted in dual redundancy such that one (e.g., 500a) of the control nodes 500a and 500b is a currently operating system and is operated in the usual state, and that the other (e.g., the control node 500b) is a standby system and is held standby in the usual state. For example, when the control node 500a serving as the currently operating system has failed, the control node 500b maintained as the standby system is operated instead of the control node 500a.

When the storage system is started up, the control nodes 500a and 500b assign the storage devices 200a to 200d and the cache memories to the storage nodes 100a to 100d.

Further, the control nodes 500a and 500b can detect a failure of the storage nodes 100a to 100d and a failure of the cache memories. Upon detecting a failure of the storage nodes 100a to 100d, the control nodes 500a and 500b newly assign the storage device and the cache memory, which have been so far assigned to the failed storage node, to another storage node.

In addition, each of the control nodes 500a and 500b holds, in the form of, e.g., a connection state table, the setting of assignment of the storage devices 200a to 200d and the cache memories to the storage nodes 100a to 100d. When the assignment is performed at the startup, or when the assignment is updated with a new assignment upon, e.g., detection of a failure, the control nodes 500a and 500b update the connection state table and record the latest assignment setting.

The management node 300 is a computer operated by an administrator of the storage system. The administrator of the storage system can access the storage nodes 100a to 100d and the control nodes 500a and 500b, and further can perform various settings required for the operation by operating the management node 300.

The terminal devices 400a to 400c are computers operated by users of the storage system. The users of the storage system can access the storage nodes 100a to 100d and can perform reading/writing of data stored in the storage devices 200a to 200d by operating the terminal devices 400a to 400c.

The respective hardware configurations of the storage nodes 100a to 100d, the control nodes 500a and 500b, the terminal devices 400a to 400c, and the management node 300 will be described below.

Figure 3:
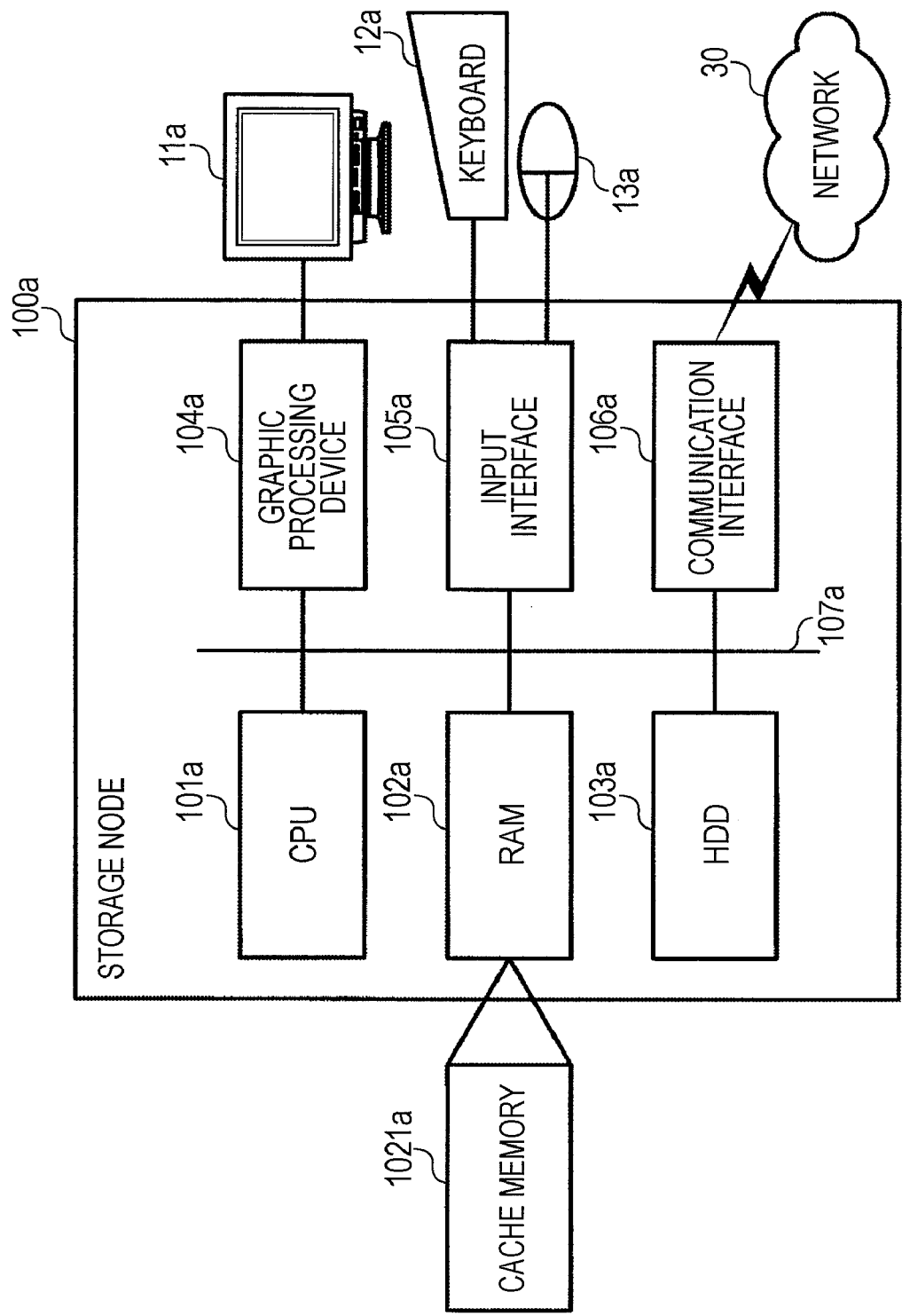
FIG. 3 is a block diagram showing the hardware configuration of a storage node.

FIG. 3 is a block diagram showing the hardware configuration of the storage node. The storage node 100a is entirely controlled by a CPU (Central Processing Unit) 101a. A RAM (Random Access Memory) 102a, an HDD 103a, a graphic processing device 104a, an input interface 105a, and a communication interface 106a are connected to the CPU 101a via a bus 107a.

The RAM 102a temporarily stores at least part of a program of an OS (Operating System) causing the CPU 101a to run and execute application programs. The RAM 102a also stores various data necessary for processing executed by the CPU 101a. A portion of the RAM 102a in the storage node 100a is a cache memory 1021a which can temporarily store data written into the storage devices 200a to 200d. The cache memory 1021a functions as a temporary storage unit (means). While the cache memory 1021a is arranged as a portion of the RAM 102a in this embodiment, the arrangement of the cache memory 1021a is not limited to that described in this embodiment. The cache memory 1021a may be arranged separately from the RAM 102a.

The programs of the OS and the applications are stored in the HDD 103a. A monitor 11a is connected to the graphic processing device 104a. The graphic processing device 104a displays an image on a screen of the monitor 11a in accordance with an instruction from the CPU 101a. A keyboard 12a and a mouse 13a are connected to the input interface 105a. The input interface 105a transmits signals sent from the keyboard 12a and the mouse 13a to the CPU 101a via the bus 107a.

The communication interface 106a is connected to the network 30. The communication interface 106a transmits and receives data to and from other computers, such as the control nodes 500a and 500b, via the network 30. Also, generally, one of the storage devices 200a to 200d interconnected via the network 30, which is assigned to the storage node 100a, is connected to the storage node 100a via the communication interface 106a. The communication interface 106a communicates with RAID controllers (not shown) built in the storage devices 200a to 200d to perform inputting/outputting of data to and from the storage devices 200a to 200d. The RAID controller in the storage device 200a has the functions of RAID0 to RAID5.

The storage nodes 100b to 100d, the control nodes 500a and 500b, and the terminal devices 400a to 400c can also be each represented by a similar hardware configuration to that of the storage node 100a. However, communication interfaces of the terminal devices 400a to 400c are connected to the network 40.

The module configuration of the storage nodes 100a to 100d will be described below.

Figure 4:
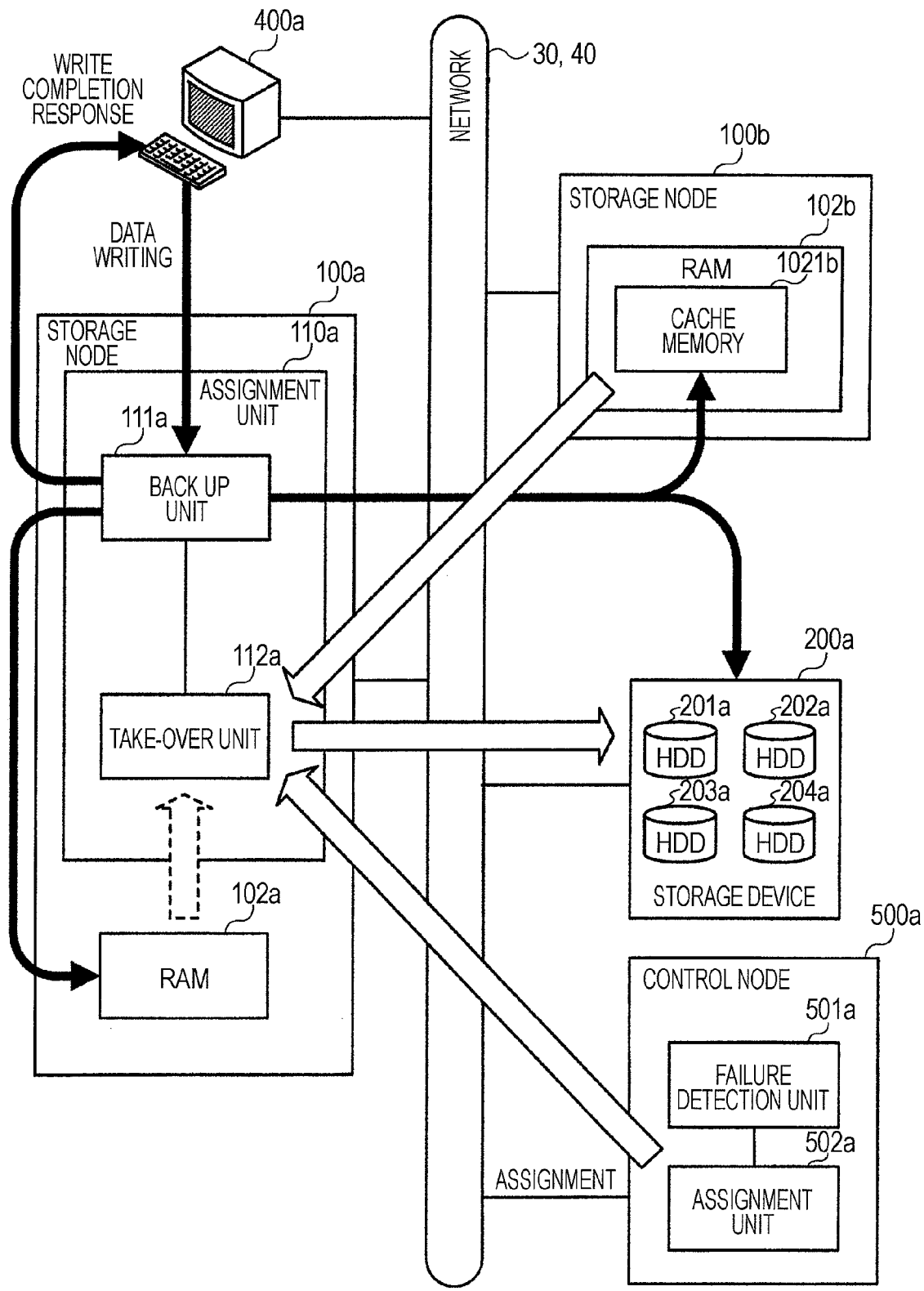
FIG. 4 is a block diagram showing the functions of the storage node.

FIG. 4 is a block diagram showing the functions of the storage node. While FIG. 4 shows the module configuration of the storage node 100a, the storage nodes 100b to 100d can also be realized with a similar module configuration to that of the storage node 100a.

The storage system of this embodiment is to distribute and store data in a plurality of storage devices which are interconnected via a network. In the storage system of this embodiment, each of the other storage nodes 100b to 100d also has the same functions as those of the storage node 100a. Further, in the storage system of this embodiment, the storage nodes 100a to 100d and the control nodes 500a and 500b operate in a cooperated manner as described below. The following description is made of the storage nodes 100a and 100b, the storage device 200a, the terminal device 400a, and the control node 500a, which are extracted as typical examples, as shown in FIG. 4, from the components of the storage system.

In FIG. 4, for the convenience of explanation, the network 30 and the network 40 are shown as one network. Also, the components of the storage system are interconnected, as required, via the network 30 and the network 40.

The storage node 100a manages the storage device 200a and a cache memory 1021b described later. The storage node 100a has a management unit 110a. The management unit 110a includes a backup unit 111a and a take-over unit 112a for managing the storage device 200a and the cache memory 1021*b* which are assigned thereto. Further, the storage node 100*a* has a RAM 102*a*. The storage node 100*a* stores, in the RAM 102*a*, data to be written into the storage device 200*a*.

When data is written into the storage device 200*a* in response to a request from the terminal device 400*a*, for example, the backup unit 111*a* stores not-yet-written data, of which writing to the storage device 200*a* is not yet completed, in the previously assigned cache memory 1021*b* as well before the data transmitted from the terminal device 400*a* is completely written into the storage device 200*a*. Thus, in the event of a failure of the storage node 100*a*, because the data to be written into the storage device 200*a* is stored in the cache memory 1021*b* which is disposed externally of the storage node 100*a*, the data can be written into the storage device 200*a* by using the data stored in the cache memory 1021*b*. As a result, loss of data caused by the failure of the storage node 100*a* can be prevented.

The cache memory 1021*b* is a storage unit for temporarily storing data for backup, and it can be a storage device such as an ordinary cache memory. After the writing of the data read out from the cache memory 1021*b* into the storage device 200*a* has been completed, the backup unit 111*a* erases that data from the cache memory 1021*b*. Accordingly, the data having been completely written into the storage device 200*a* is erased from the cache memory 1021*b*, while data of which writing into the storage device 200*a* is not yet completed continues to remain in the cache memory 1021*b*. As a result, when the storage node 100*a* has failed, the presence or absence of the data of which writing into the storage device 200*a* is not yet completed can be easily determined and specified.

Further, the backup unit 111*a* stores the data, which is to be written into the storage device 200*a*, in the RAM 102*a* of the storage node 100*a* as well before the completion of writing of the data. Accordingly, even with a failure generated in the storage node 100*b* including the cache memory 1021*b*, since the data to be written into the storage device 200*a* is stored in the RAM 102*a*, writing of the data into the storage device 200*a* can be performed by using the data stored in the RAM 102*a*. As a result, loss of data caused by the failure of the cache memory 1021*b* can be prevented.

Still further, after the writing of the data into the storage device 200*a* has been completed, the backup unit 111*a* erases the data that has been written into the RAM 102*a*. Accordingly, the data that has been completely written into the storage device 200*a* is erased, while data of which writing into the storage device 200*a* is not yet completed continues to remain in the RAM 102*a*. As a result, when the cache memory 1021*b* has failed, the presence or absence of the data of which writing into the storage device 200*a* is not yet completed can be easily determined and specified.

In addition, after the writing of data into the cache memory 1021*b* has been completed, but before the writing of the same data into the storage device 200*a* is completed, the backup unit 111*a* transmits a write completion response for notifying the completion of the writing of that data to the terminal device 400*a* via the networks 30 and 40.

If there is data which is stored in the cache memory 1021*b*, but which is not yet written into the storage device 200*a* when the storage device 200*a* and the cache memory 1021*b* are newly assigned to the storage node 100*a* by the control node 500*a*, the take-over unit 112*a* reads that data from the cache memory 1021*b* and writes it into the storage device 200*a*.

Also, if there is data which is stored in the RAM 102*a*, but which is not yet written into the storage device 200*a* when the cache memory 1021*b* is newly assigned by the control node 500*a*, the take-over unit 112*a* reads that data from the RAM 102*a* and writes it into the storage device 200*a*. At that time, if the data having been written into the RAM 102*a* by the backup unit 111*a* remains, the take-over unit 112*a* determines that not-yet-written data is present, and then writes the not-yet-written data into the storage device 200*a*.

While the storage node 100*b* is constructed similarly to the storage node 100*a* and has the same function as the storage node 100*a*, only those of the functions of the storage node 100*b* which are necessary for explaining the operation of the storage node 100*a* will be discussed in the following description. As in the storage node 100*a* described above with reference to FIG. 3, the storage node 100*b* has a RAM 102*b* which is a volatile memory. A portion of the RAM 102*b* is constituted as the cache memory 1021*b* for temporarily storing the data to be written into the storage device 200*a*, etc.

The storage device 200*a* is a disk array device which is constituted, as described above, by the built-in HDDs 201*a* to 204*a*, and which provides disk management service of RAID5. Only the storage node 100*a* assigned by the control node 500*a* can exclusively access the storage device 200*a* via the networks 30 and 40.

The control node 500*a* is a computer for managing the storage nodes 100*a* and 100*b* and the storage device 200*a*. The control node 500*a* controls the storage system by managing the storage node 100*a* that manages the storage device 200*a*. In this embodiment, as described above, the control node is constituted in dual redundancy as the control nodes 500*a* and 500*b*. Herein, the control node 500*a* is assumed to be operated as a currently operating system, and the control node 500*b* held in the standby state as a standby system is omitted from the following description.

The control node 500*a* includes a failure detection unit 501*a* for detecting a failure of the storage node 100*a*, and an assignment unit 502*a* for assigning the storage device 200*a* and the cache memory 1021*b* to the storage node 100*a*.

It is herein assumed that, at the startup of the storage system, the control node 500*a* exclusively assigns the storage node 100*a* to the storage device 200*a* and the cache memory 1021*b*. In other words, the storage device 200*a* and the cache memory 1021*b* are assigned such that the storage nodes other than the storage node 100*a* cannot access the storage device 200*a* and the cache memory 1021*b*.

The failure detection unit 501*a* can detect a failure of each of the storage nodes 100*a* to 100*d* constituting the storage system. More specifically, the failure detection unit 501*a* periodically transmits a heart beat to the storage nodes 100*a* to 100*d* so that it can detect a failure of each of the storage nodes 100*a* to 100*d* constituting the storage system upon break-off of a corresponding response to the heart beat.

Further, the failure detection unit 501*a* can detect a failure of each of the cache memories 1021*a* to 1021*d* constituting the storage system. When one of the storage nodes 100*a* to 100*d* detects a failure of corresponding one of the cache memories 1021*a* to 1021*d* assigned thereto, for example, by detecting the fact that data cannot be written into the particular one of the cache memories 1021*a* to 1021*d*, the relevant storage node notifies the failure of the assigned cache memory to the control node 500*a*. By receiving the notification of the failure of the cache memory, the failure detection unit 501*a* detects the failure of the one of the cache memories 1021*a* to 1021*d*.

More specifically, the failure detection unit 501*a* of the control node 500*a* communicates with each storage node to periodically monitor whether a write process to each cache memory has succeeded or failed. The failure detection unit 501*a* collects via communication the results of monitoring whether the write process to the cache memory of each storage node has succeeded or failed. The failure detection unit 501a can detect the failure of each of the cache memories 1021a to 1021d by checking whether a preset determination condition, e.g., "if the write process to a particular cache memory has failed successively over a predetermined number of times, that cache memory is regarded as being failed", is satisfied.

Though described in detail later, when the failure of the storage node 100a is detected by the failure detection unit 501a, the assignment unit 502a assigns the storage device 200a and the cache memory 1021b assigned so far to the storage node 100a, for which the failure has been detected by the failure detection unit 501a, to another storage node. While in this embodiment the assignment unit 502a assigns the storage device 200a and the cache memory 1021b both assigned so far to the storage node 100a, for which the failure has been detected, to another storage node, the assignment method is not limited to that described in this embodiment. The assignment unit 502a may assign only one of the storage device 200a and the cache memory 1021b to another storage node.

Further, when a cache memory is newly assigned to the storage node 100a, the assignment unit 502a assigns, to the storage node 100a, the cache memory 1021b which is included in the storage node 100b other than the storage node 100a. Stated another way, the cache memory 1021b is assigned to the storage node (e.g., the storage node 100a in this embodiment) other than the storage node 100b which includes the cache memory 1021b. Therefore, for example, even when the storage node 100a has failed, the data to be written into the storage device 200a, which is assigned to the storage node 100a, is not lost and remains in the cache memory 1021b which is included in the storage node 100b. As a result, failure resistance is enhanced and reliability of the storage system is increased.

Thus, when the storage node 100a has failed, the storage device 200a and the cache memory 1021b, which have been so far assigned to the failed storage node 1100a, are assigned to another storage node by the control node 500a after it detects the failure of the storage node 100a.

Further, when the failure of the cache memory 1021b is detected by the failure detection unit 501a, the assignment unit 502a assigns another cache memory to the storage node 100a to which the cache memory 1021b has been assigned.

While in this embodiment the assignment of the storage device 200a and the cache memory 1021b to the storage node 100a is preformed by the control node 500a (or the control node 500b), the assignment method is not limited to that described in this embodiment. For example, the assignment may be performed by the storage node 100a itself or another suitable device in an automatic manner according to a particular policy based on, e.g., load balance, or by the administrator in a manual manner as appropriate.

The storage device 200a and the cache memory 1021b are assigned by the control node 500a which controls the storage system by controlling the storage node 100a.

The terminal device 400a is a computer operated by the user of the storage system. The user of the storage system accesses the storage node 100a by operating the terminal device 400a. In response to a request from the user operating the terminal device 400a, the storage node 100a writes and reads data into and from the storage device 200a.

The operation of the storage node 100a will be described below with reference to FIG. 4. The operation of writing data into the storage device 200a is first described. It is here assumed that, at the startup of the storage system, the storage device 200a and the cache memory 1021b are assigned to the storage node 100a by the control node 500a.

When the terminal device 400a is operated by the user of the storage system and writing of data is requested to the storage node 100a, the storage node 100a writes the data into the storage device 200a in response to the user's request.

At that time, the backup unit 111a in the storage node 100a stores, in the RAM 102a, the data to be written into the storage device 200a. Then, the backup unit 111a starts writing of the data stored in the RAM 102a into the cache memory 1021b and the storage device 200a, which are assigned to the storage node 100a by the control node 500a. Herein, because a time required for writing the data into the cache memory 1021b is shorter than that required for writing the data into the storage device 200a, the data writing into the cache memory 1021b is completed earlier.

When the data writing into the storage device 200a has been normally performed and completed, the backup unit 111a erases the data that has been written into the RAM 102a and the cache memory 1021b. On the other hand, if an abnormality occurs in the data writing into the storage device 200a and the data writing is not completed, the backup unit 111a does not erase the data that has been written into the RAM 102a and the cache memory 1021b. As a result, even if a failure occurs in any of the storage node 100a, the cache memory 1021b, and the storage device 200a, loss of data can be prevented. Stated another way, when the data is normally written into the storage device 200a, the data having been written into the cache memory 1021b by the backup unit 111a is erased from the cache memory 1021b by the backup unit 111a after the completion of the data writing.

Thus, because the data having been completely written into the storage device 200a is erased from the cache memory 1021b, the data still stored in the cache memory 1021b is data that is not yet written into the storage device 200a. In other words, in the cache memory 1021b, there is only the data which is to be written into the storage device 200a in response to the write request from the user, but which is not yet written into the storage device 200a. Further, the other storage nodes also have the same functions as those of the storage node 100a. Accordingly, by assigning the storage device 200a and the cache memory 1021b to one of the other storage nodes by the control node 500a, the not-yet-written data remaining in the cache memory 1021b can be written into the storage device 200a by the other storage node.

The operation of the take-over unit 112a in the storage node 100a will be described below in connection with, for example, the case of a failure generated in a storage node (not shown) to which the cache memory 1021b has been assigned. When the relevant storage node has failed after data has been written into the cache memory 1021b by the backup unit (not shown) in the failed storage node, but before the data writing into the storage device 200a is completed, the writing of the data is not completed and therefore the not-yet-written data remains in the cache memory 1021b without being erased. Thereafter, the storage device 200a and the cache memory 1021b are newly assigned to the storage node 100a by the control node 500a. The not-yet-written data remaining in the cache memory 1021b is read from the cache memory 1021b by the take-over unit 112a of the storage node 100a and is written into the storage device 200a.

Stated another way, so long as the not-yet-written data which is to be written into the storage device 200a by the failed storage node and which is not yet written into the storage device 200a by the failed storage node 100a remains in the cache memory 1021b, it is possible to determine the presence or absence of the not-yet-written data and to specify the not-yet-written data itself. The not-yet-written data is written into the storage device 200a by the take-over unit 112a of the storage node 100a which is set to succeed the failed storage node when the storage device 200a and the cache memory 1021b are newly assigned.

The take-over unit 112a and the storage node 100a can realize the above-mentioned process by various methods. In one example of the various methods, as described above, after a certain storage node has completed the writing of the data received from the terminal device 400a into the storage device, the data stored in the cache memory 1021b by the backup unit of the certain storage node is erased. With such erasing, data in the progress of writing into the storage device 200a, which is set in a corresponding relation to the cache memory 1021b by assignment, is stored in the cache memory 1021b, whereas the data having been already reflected is erased. As a result, only the not-yet-reflected data is stored in the cache memory 1021b. Thereafter, when the storage device 200a and the cache memory 1021b are newly assigned, the take-over unit 112a of the storage node 100a writes the data stored in the cache memory 1021b into the storage device 200a.

In another example, a table is prepared to load the data stored in the storage device 200a and the cache memory 1021b, which correspond to each other by assignment. At the time of a new assignment, the table is checked and data stored (updated) in only the cache memory 1021b is reflected on the storage device 200a. Other suitable methods are also usable.

The connection state table used in the control nodes 500a and 500b in this embodiment will be described below.

FIG. 5 illustrates the data structure of the connection state table. A connection state table 510, shown in FIG. 5, is prepared and managed by the control node 500a serving as the currently operating system and the control node 500b maintained as the standby system. The connection state table 510 stores connection information with respect to the storage nodes, the storage devices, and the cache memories in the storage system.

The connection state table 510 has a column of "storage node name" indicating respective names of the storage nodes arranged in the storage system, a column of "storage name" indicating respective names of the storage devices arranged in the storage system, and a column of "cache device name" indicating respective names of the cache memories arranged in the storage system. Items of the information lying horizontally in the three columns are correlated with one another to provide connection state information representing the storage device and the cache memory which are assigned to the storage node.

The connection state information stored in the connection state table 510 is updated by the currently operating control node 500a, as required, when the storage system is started up and when the assignment is changed due to a failure, etc. The same table is also stored in the standby control node 500b and is updated as required.

For example, the top row of the connection state table 510 in FIG. 5 stores information indicating that the storage node name is "SN-A", the storage (device) name is "DISK-A", and the cache device name is "CACHE-A".

The above information means that the storage device having the name "DISK-A" and the cache memory having the name "CACHE-A" are assigned to the storage node having the name "SN-A".

In other words, the above information means that the storage node "SN-A" manages the storage device "DISK-A" and the cache memory "CACHE-A", and that data written into the storage device "DISK-A" is also written into the cache memory "CACHE-A".

Figure 6:
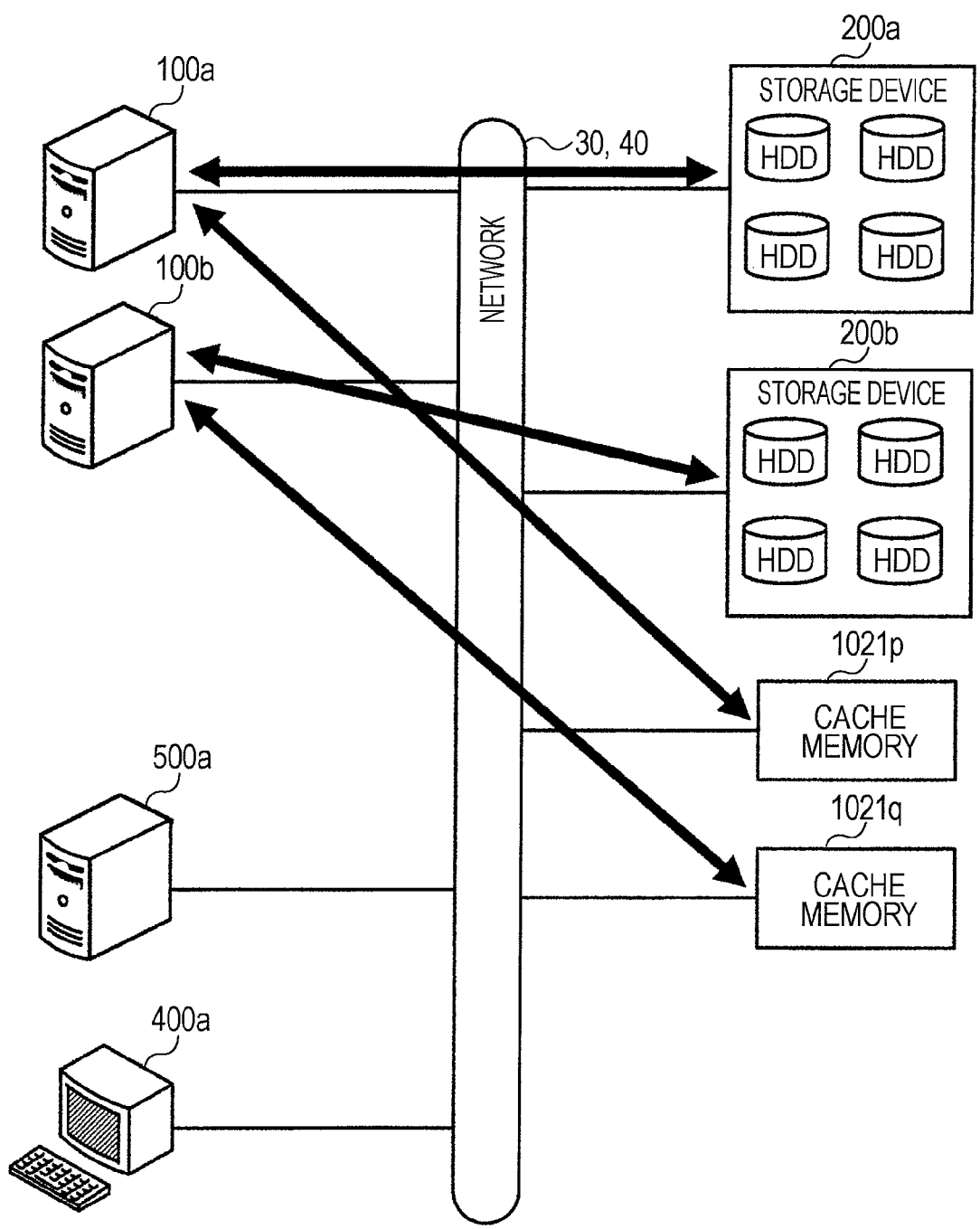
FIG. 6 illustrates one example of assignment setting when a storage system is started up.
Figure 7:
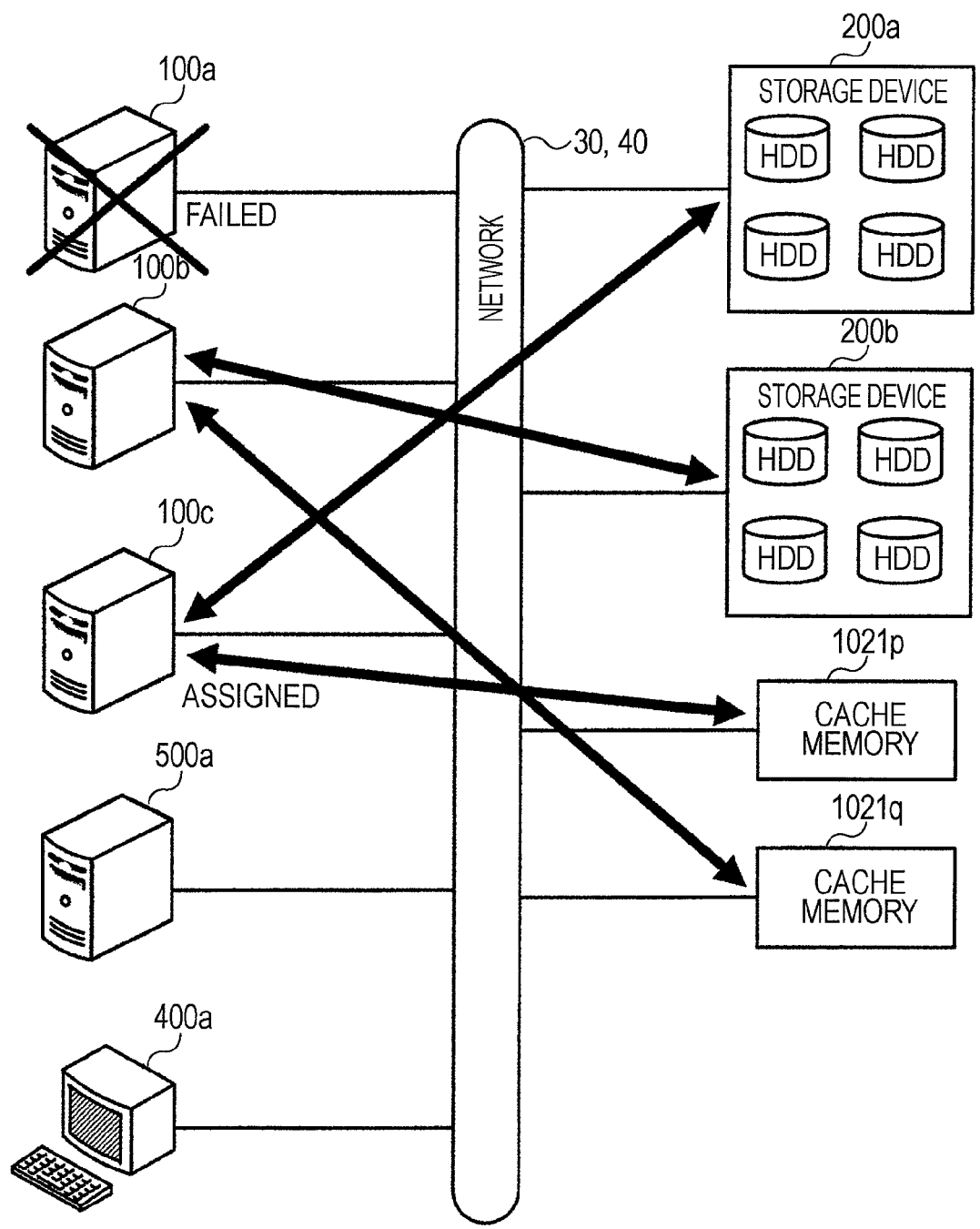
FIG. 7 illustrates one example of the assignment setting when the storage node has failed.
Figure 8:
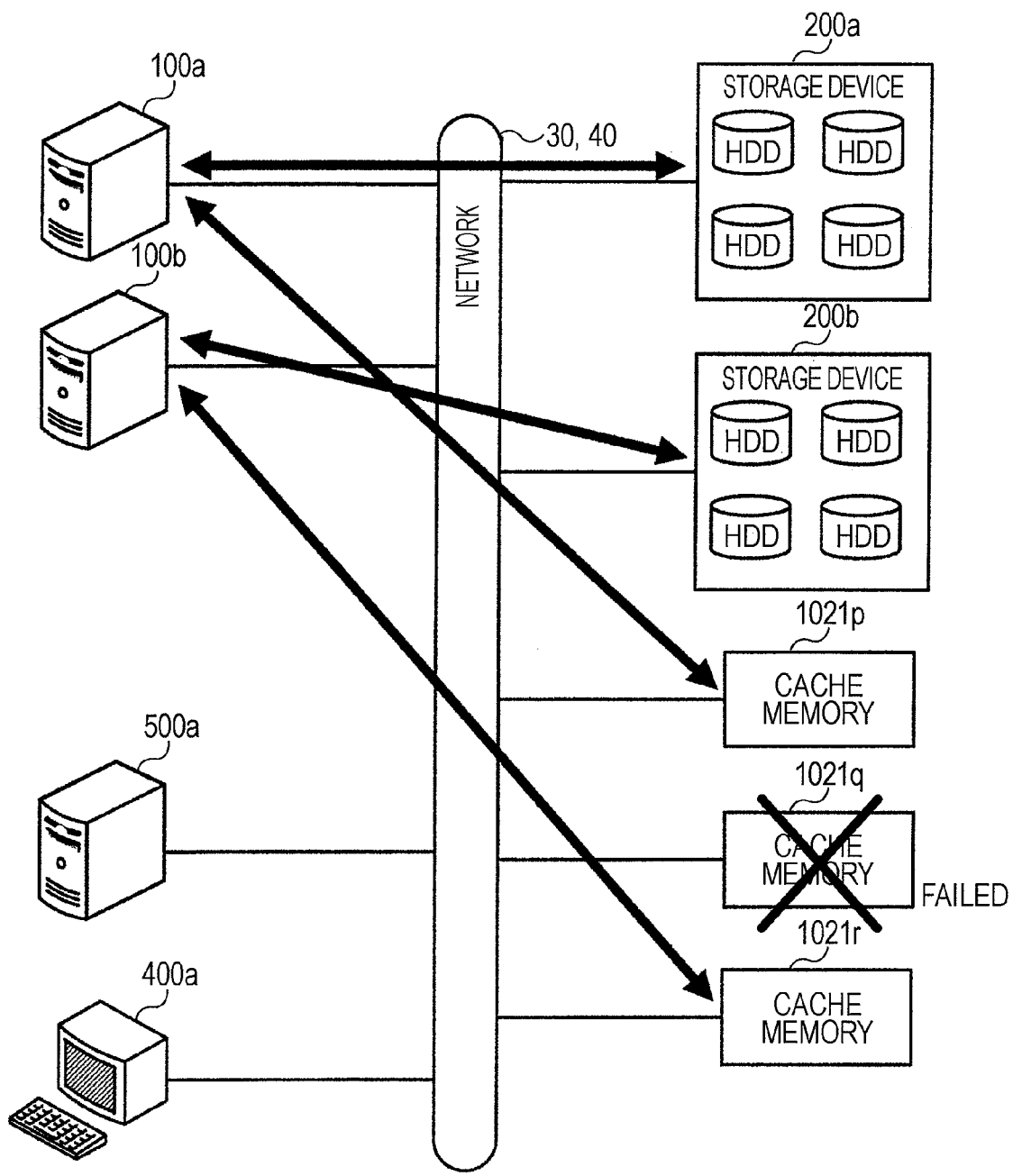
FIG. 8 illustrates one example of the assignment setting when a cache memory has failed.

The operation of the storage system in a process of assigning the storage device and the cache memory will be described below. FIG. 6 illustrates one example of assignment when the storage system is started up. FIG. 7 illustrates one example of assignment when the storage node has failed. FIG. 8 illustrates one example of assignment when the cache memory has failed. The state of the storage system after the assignment at the startup of the storage system will be first described with reference to FIG. 6.

The following description is made by extracting, as shown in FIG. 6, only the related components, i.e., the storage nodes 100a and 100b, the storage devices 200a and 200b, the terminal device 400a, the control node 500a, cache memories 1021p and 1021q, and the networks 30 and 40.

For the convenience of explanation, the network 30 and the network 40 are shown as one network in FIG. 6. The illustrated components are interconnected, as required, via the networks 30 and 40. It is also assumed that the cache memories 1021p and 1021q are included in not-shown storage nodes other than the storage nodes 100a and 100b.

In FIG. 6, at the startup of the storage system, the storage device 200a and the cache memory 1021p are assigned to the storage node 100a by the control node 500a. With that assignment, the storage node 100a manages the storage device 200a and uses the cache memory 1021p for backup when data is written into the storage device 200a.

For example, assuming that the user enters a request for writing data into the storage device 200a by using the terminal device 400a, upon receiving the data transmitted from the terminal device 400a, the storage node 100a temporarily writes the received data in the cache memory 1021p for backup. Then, the storage node 100a writes the received data into the storage device 200a. When the data writing into the storage device 200a has been normally performed and completed, the storage node 100a erases the data having been written into the cache memory 1021p. In such a manner, the storage node 100a writes data into the storage device 200a while backing up the data by using the cache memory 1021p.

Further, at the startup of the storage system, the storage device 200b and the cache memory 1021q are assigned to the storage node 100b by the control node 500a. When the user enters a data write request by using the terminal device 400a, the storage node 100b operates similarly to the storage node 100a and writes data into the storage device 200b while backing up the data by using the cache memory 1021q.

In this embodiment, the storage node is exclusively assigned to the storage device and the cache memory. Stated another way, in FIG. 6, the storage node 100a to which the storage device 200a and the cache memory 1021p are assigned can exclusively accesses the storage device 200a and the cache memory 1021p. Any of the other storage nodes cannot access the storage device 200a and/or the cache memory 1021p unless it is assigned thereto.

The above-described assignment setting of the storage system is managed by the control node 500a as the connection state information that is stored in the connection state table shown in FIG. 5.

The state of the storage system after assignment performed in the event of a failure of the storage node 100a will be described below with reference to FIG. 7.

The following description is made by extracting, as shown in FIG. 7, only the related components, i.e., the storage nodes 100a to 100c, the storage devices 200a and 200b, the terminal device 400a, the control node 500a, the cache memories 1021p and 1021q, and the networks 30 and 40.

For the convenience of explanation, as in FIG. 6, the network 30 and the network 40 are shown as one network in FIG. 7. The illustrated components are interconnected, as required, via the networks 30 and 40. It is also assumed that the cache memories 1021p and 1021q are included in not-shown storage nodes other than the storage nodes 100a to 100c.

In FIG. 7, as in the case of FIG. 6, the storage device 200b and the cache memory 1021q are assigned to the storage node 100b by the control node 500a. On the other hand, the storage node 100a has failed. The storage device 200a and the cache memory 1021p, which have been so far assigned to the failed storage node 100a, are newly assigned to the storage node 100c by the control node 500a, which has detected the failure of the storage node 100a. With that reassignment, the storage node 100c manages the storage device 200a and uses the cache memory 1021p for backup when data is written into the storage device 200a.

For example, when the user enters a request for writing data into the storage device 200a by using the terminal device 400a, the newly assigned storage node 100c receives the data transmitted from the terminal device 400a and temporarily writes the received data in the cache memory 1021p for backup. Then, the storage node 100c writes the received data into the storage device 200a. When the data writing into the storage device 200a has been normally performed and completed, the storage node 100c erases the data having been written into the cache memory 1021p. In such a manner, the storage node 100c newly assigned instead of the storage node 100a writes data into the storage device 200a while backing up the data by using the cache memory 1021p.

The state of the storage system after assignment performed in the event of a failure of the cache memory will be described below with reference to FIG. 8.

The following description is made by extracting, as shown in FIG. 8, only the related components, i.e., the storage nodes 100a and 100b, the storage devices 200a and 200b, the terminal device 400a, the control node 500a, the cache memories 1021p to 1021r, and the networks 30 and 40.

For the convenience of explanation, as in FIG. 6, the network 30 and the network 40 are shown as one network in FIG. 8. The illustrated components are interconnected, as required, via the networks 30 and 40. It is also assumed that the cache memories 1021p to 1021r are included in not-shown storage nodes other than the storage nodes 100a and 100b.

In FIG. 8, as in the case of FIG. 6, the storage device 200a and the cache memory 1021p are assigned to the storage node 100a by the control node 500a. On the other hand, the cache memory 1021q has failed. The cache memory 1021r is newly assigned to the storage node 100b, to which the cache memory 1021q has been so far assigned, by the control node 500a, which has detected the failure of the cache memory 1021q. With that reassignment, the storage node 100b manages the storage device 200b and uses the cache memory 1021r for backup when data is written into the storage device 200b.

For example, when the user enters a request for writing data into the storage device 200b by using the terminal device 400a, the storage node 100b receives the data transmitted from the terminal device 400a and temporarily writes the received data in the cache memory 1021r for backup. Then, the storage node 100b writes the received data into the storage device 200b. When the data writing into the storage device 200b has been normally performed and completed, the storage node 100b erases the data having been written into the cache memory 1021r. In such a manner, the storage node 100b writes data into the storage device 200b while backing up the data by using the cache memory 1021r which has been newly assigned instead of the cache memory 1021q.

While in this embodiment the cache memories are arranged as respective portions of the RAMs in the storage nodes, the arrangement of the cache memories is not limited to that described in this embodiment. For example, the cache memories may be arranged, separately from the storage nodes, as independent cache devices in the form of, e.g., a cache dedicated server or a cache dedicated storage device on the network.

The above-described changes of the assignment setting caused with the occurrence of failures are also reflected by the control node 500a, as described above with reference to FIG. 6, on update of the connection state information that is stored and managed in the connection state table shown in FIG. 5.

Figure 10A:
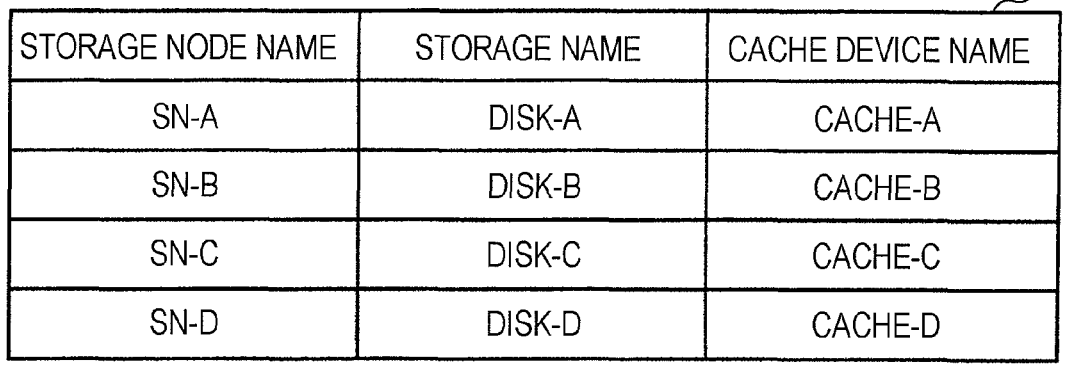
FIG. 10A is a table for explaining update of the connection state table when the cache memory has failed.
Figure 10B:
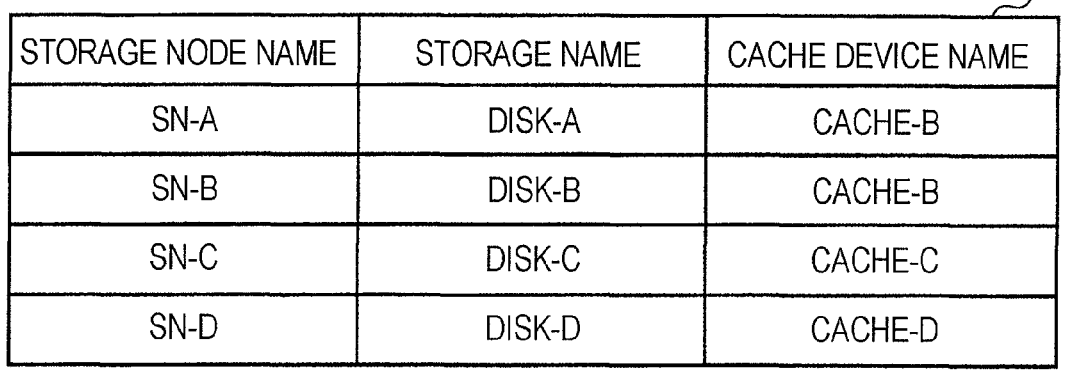
FIG. 10B is a table for explaining the update of the connection state table when the cache memory has failed.

The update of the connection state information with the assignment will be described below. FIGS. 9A and 9B are tables for explaining the update of the connection state table when the storage node has failed, and FIGS. 10A and 10B are tables for explaining the update of the connection state table when the cache memory has failed.

The update of the connection state table with the assignment performed upon the occurrence of a failure of the storage node is first described with reference to FIGS. 9A and 9B. FIG. 9A illustrates the connection state table before a failure occurs in the storage node "SN-A". FIG. 9B illustrates the connection state table in the updated state after the assignment performed upon the occurrence of the failure of the storage node "SN-A" has been reflected.

As described above, the connection state table is stored in the control nodes 500a and 500b for managing the assignment setting in the storage system.

The following description is made in connection with the case where the storage node "SN-A" has failed and the storage device "DISK-A" and the cache memory "CACHE-A", which have been so far assigned to the storage node "SN-A", are newly assigned to the storage node "SN-C". Note that the storage node "SN-A" in FIGS. 9A and 9B corresponds to the storage node 100a in FIG. 7. Similarly, the storage device "DISK-A" corresponds to the storage device 200a in FIG. 7 and the cache memory "CACHE-A" corresponds to the cache memory 1021a in FIG. 7.

The connection state information put in the top row of a connection state table 520, shown in FIG. 9A, indicates that the storage node "SN-A", the storage device "DISK-A", and the cache memory "CACHE-A" are correlated with one another. This means that the storage device "DISK-A" and the cache memory "CACHE-A" are assigned to the storage node "SN-A".

The connection state information put in the top row of a connection state table 530, shown in FIG. 9B, indicates that the storage node "SN-C", the storage device "DISK-A", and the cache memory "CACHE-A" are correlated with one another. This means that the storage device "DISK-A" and the cache memory "CACHE-A" are assigned to the storage node "SN-C".

Stated another way, in FIGS. 9A and 9B, since the storage device "DISK-A" and the cache memory "CACHE-A" are assigned by the control nodes 500a and 500b to the storage node "SN-C" instead of the failed storage node "SN-A", the connection state table is updated from the connection state table 520, shown in FIG. 9A, to the connection state table 530, shown in FIG. 9B, corresponding to the above-described assignment.

The update of the connection state table with the assignment performed upon the occurrence of a failure of the cache memory is next described with reference to FIGS. 10A and 10B. FIG. 10A illustrates the connection state table before a failure occurs in the cache memory "CACHE-A". FIG. 10B illustrates the connection state table in the updated state after the assignment made upon the occurrence of a failure of the cache memory "CACHE-A" has been reflected.

The following description is made in connection with the case where the cache memory "CACHE-A" assigned to the storage node "SN-A" has failed and the cache memory "CACHE-B" is newly assigned instead of the cache memory "CACHE-A" to the storage node "SN-A". Note that the storage node "SN-A" in FIGS. 10A and 10B corresponds to the storage node 100a in FIG. 8. Similarly, the storage device "DISK-A" corresponds to the storage device 200a in FIG. 8 and the cache memory "CACHE-A" corresponds to the cache memory 1021a in FIG. 8.

As in the table of FIG. 9A, the connection state information put in the top row of a connection state table 540, shown in FIG. 10A, indicates that the storage node "SN-A", the storage device "DISK-A", and the cache memory "CACHE-A" are correlated with one another. This means that the storage device "DISK-A" and the cache memory "CACHE-A" are assigned to the storage node "SN-A".

The connection state information put in the top row of a connection state table 550, shown in FIG. 10B, indicates that the storage node "SN-A", the storage device "DISK-A", and the cache memory "CACHE-B" are correlated with one another. This means that the storage device "DISK-A" and the cache memory "CACHE-B" are assigned to the storage node "SN-A".

Stated another way, in FIGS. 10A and 10B, since the cache memory "CACHE-B" is assigned instead of the failed cache memory "CACHE-A" to the storage node "SN-A" by the control nodes 500a and 500b, the connection state table is updated from the connection state table 540, shown in FIG. 10A, to the connection state table 550, shown in FIG. 10B, corresponding to the above-described assignment.

The procedures of processing executed in the storage system of this embodiment will be described below. A startup assignment process is first described which is executed at the startup of the storage system of this embodiment. FIG. 11 is a sequence chart showing the procedures of the assignment process at the startup of the storage system.

At the startup of the storage system of this embodiment, the storage device and the cache memory are assigned to each storage node by the control node through polling. With the assignment, the control node exclusively connects the storage device and the cache memory to the storage node.

With reference to FIG. 11, a description is made of the case where the storage device (e.g., the storage device 200a) and the cache memory (e.g., the cache memory 1021b) are assigned to the storage node (e.g., the storage node 100a) by the currently operating control node (e.g., the control node 500a). It is here assumed that the cache memory 1021b is arranged inside the RAM 102b which is included in the storage node 100b.

[Step S110] The control node 500a notifies the storage node 100a of the assignment of the storage device 200a and the cache memory 1021b thereto via the network 30 and issues a connection request.

[Step S121] Upon receiving the connection request transmitted from the control node 500a, the storage node 100a executes a process of stopping reception of access made on the storage device which is assigned to the storage node 100a. With that process, even if there is the storage device assigned to the storage node 100a, access to data (i.e., reading/writing of data) stored in the relevant storage device from the terminal devices 400a to 400c, etc. is temporarily stopped. When access to the data stored in the storage device 200a is tried from the terminal devices 400a to 400c during a period until the stop of access is canceled and the access is resumed, an error response is transmitted to the terminal device having tried the access.

[Step S122] If not-yet-written data which is to be written into the storage device 200a, but which is not yet written into the storage device 200a is present in the cache memory 1021b, the storage node 100a executes a process of reading the not-yet-written data.

[Step S133] The not-yet-written data to be written into the storage device 200a, which is written in the cache memory 1021b, is transmitted from the cache memory 1021b to the storage node 100a. This process is executed by the storage node 100b which includes the cache memory 1021b.

[Step S124] The storage node 100a transmits the not-yet-written data, which has been read (transmitted) in step S133, to the storage device 200a such that the not-yet-written data is written into the storage device 200a which is assigned to the storage node 100a by the control node 500a.

[Step S145] The storage device 200a stores (writes), in a HDD included therein, the not-yet-written data transmitted from the storage node 100a to which the storage device 200a is assigned. When the data writing is completed, the storage device 200a transmits a write completion response to the storage node 100a.

[Step S126] The storage node 100a erases the not-yet-written data, which has been written into the storage device 200a in step S124, from the cache memory 1021b.

[Step S137] When the not-yet-written data in the cache memory 1021b is completely erased, a data erasure completion response is transmitted to the storage node 100a. As in step S133, this erasure process is executed by the storage node 100b which includes the cache memory 1021b.

[Step S128] Upon receiving the data erasure completion response transmitted in step S137, the storage node 100a executes a process of resuming the reception of access made on the assigned storage device 200a. Correspondingly, access to the storage device 200a from the terminal devices 400a to 400c, etc. is resumed. As a result, access to the data stored in the storage device 200a from the terminal devices 400a to 400c, etc. is enabled.

[Step S129] The storage node 100a transmits a connection completion response to the control node 500a.

In the storage system of this embodiment, as described above, the control node 500a assigns the storage device 200a and the cache memory 1021b to the storage node 100a at the startup of the storage system. Also, if there is not-yet-written data which is stored in the cache memory 1021b, but which is not yet written into the storage device 200a when the storage device 200a and the cache memory 1021b are assigned, the storage node 100a to which the storage device 200a and the cache memory 1021b are assigned reads the not-yet-written data from the cache memory 1021b and writes it into the storage device 200a.

While in this embodiment the storage node 100a reads the not-yet-written data, which has been written into the cache memory 1021b, from the cache memory 1021b and writes it into the storage device 200a, the method of writing the not-yet-written data is not limited to that described in this embodiment. For example, the same data as the not-yet-written data in the cache memory 1021b may be stored in the RAM 102a of the storage node 100a or some other suitable memory, and the storage node 100a may read the not-yet-written data from the RAM 102a or the other memory and write it into the storage device 200a.

Figure 12:
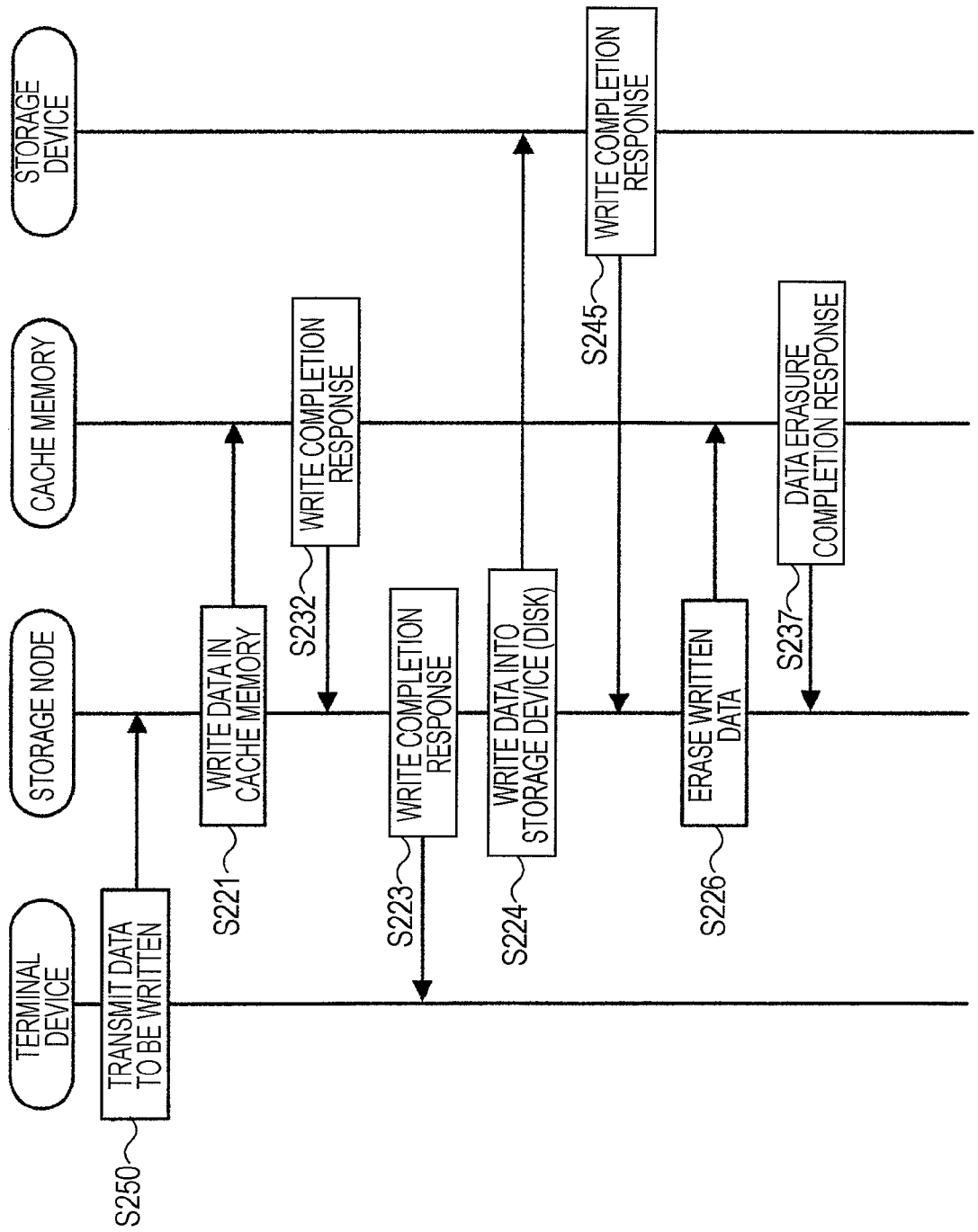
FIG. 12 is a sequence chart showing the procedures of a write process in an ordinary mode.

An ordinary write process will be described below which is executed in the storage system of this embodiment when data is written in the ordinary mode. FIG. 12 is a sequence chart showing the procedures of the write process executed in the storage node in the ordinary mode of the storage system.

In the storage system of this embodiment, a process of writing data, which is transmitted from the terminal device (e.g., the terminal device 400a) via the networks 30 and 40, into the storage device (e.g., the storage device 200a), is usually executed through the procedures described below. It is here assumed that the storage device 200a and the cache memory 1021b are assigned to the storage node 100a.

[Step S250] The terminal device 400a transmits the data, which is to be written into the storage device 200a, to the storage node 100a via the networks 30 and 40.

[Step S221] Upon receiving the data transmitted from the terminal device 400a to be written into the storage device 200a, the storage node 10a writes the received data into the cache memory 1021b.

[Step S232] When the writing of the data transmitted from the terminal device 400a into the cache memory 1021b is completed, a write completion response is transmitted to the storage node 100a. This process is executed by the storage node 100b which includes the cache memory 1021b.

[Step S223] Upon receiving the write completion response in step S232, the storage node 100a transmits the write completion response to the terminal device 400a.

[Step S224] The storage node 100a transmits the data transmitted from the terminal device 400a to the storage device 200a for writing the data into the storage device (disk) 200a.

[Step S245] The storage device 200a stores (writes), in a HDD included therein, the data transmitted from the terminal device 400a. When the data writing is completed, the storage device 200a transmits a write completion response to the storage node 100a.

[Step S226] The storage node 100a erases the data, which has been written into the storage device 200a in step S224, from the cache memory 1021b.

[Step S237] When the data having been written into the cache memory 1021b is completely erased, a data erasure completion response is transmitted to the storage node 100a. As in step S232, this erasure process is executed by the storage node 100b which includes the cache memory 1021b.

In the storage system of this embodiment, as described above, when the storage node 100a writes the data transmitted from the terminal device 400a into the storage device 200a, the storage node 100a stores the data in the cache memory 1021b as well, which is previously assigned to the storage node 100a, for backup before the data writing into the storage device 200a is completed.

Further, when the writing of the data, which is to be written into the storage device 200a, to the cache memory 1021b is completed, the storage node 100a transmits the write completion response to the terminal device 400a. Accordingly, the data transmitted from the terminal device 400a is released from the write process on the side including the terminal device 400a before the data writing into the storage device 200a is completed. Stated another way, in the ordinary mode, the writing of the data transmitted from the terminal device 400a into the storage device 200a is processed in an asynchronous manner. As a result, in the ordinary mode, the data from the terminal device 400a is immediately stored in the cache memory 1021b and to the terminal device 400a without waiting for the completion of the data writing into the storage device 200a, whereby a quicker response can be achieved in spite of taking a backup.

Figure 13:
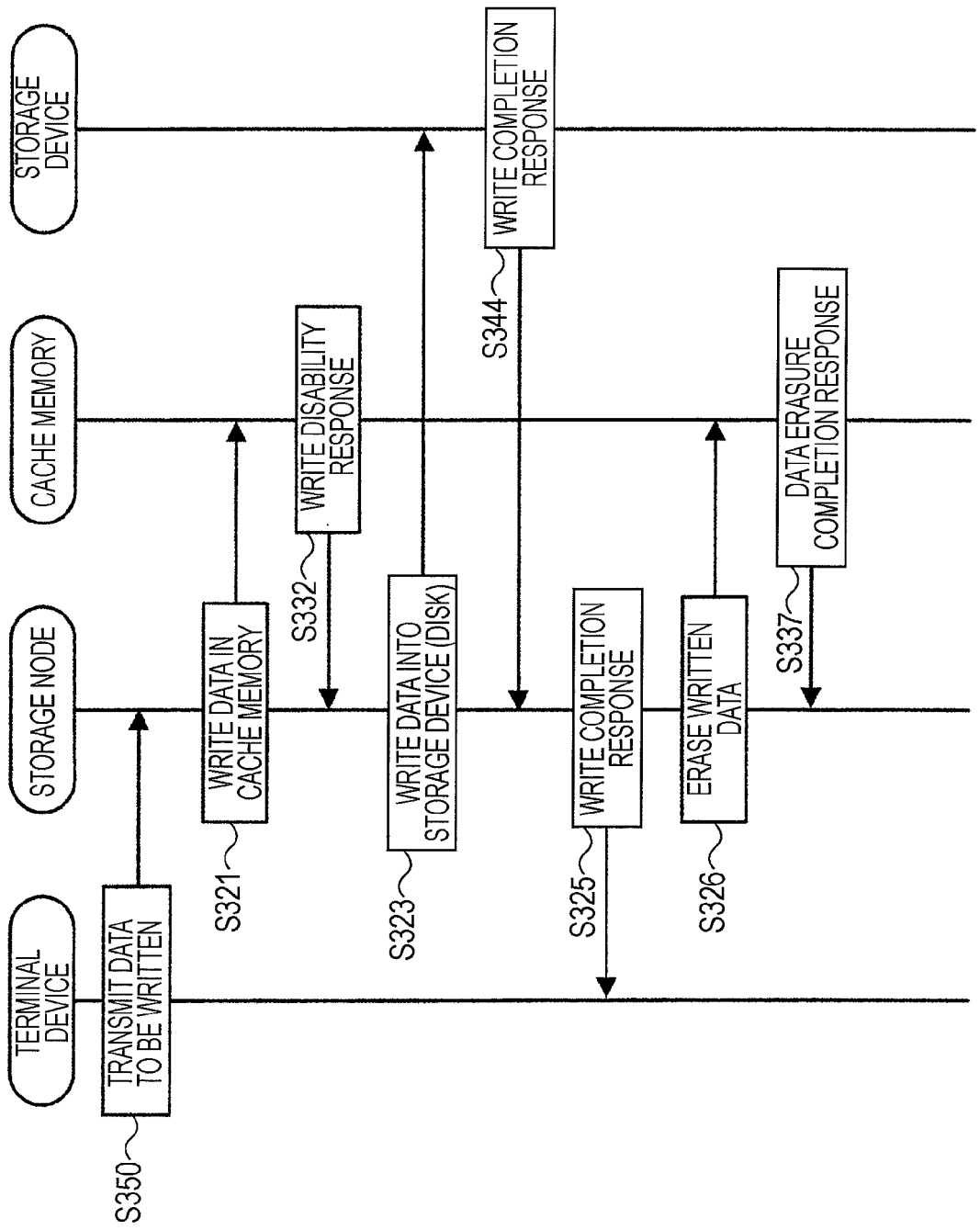
FIG. 13 is a sequence chart showing the procedures of the write process when the cache memory has no vacancy.

A synchronous write process in the storage system of this embodiment will be described below which is executed in writing data when the cache memory has no vacancy. FIG. 13 is a sequence chart showing the procedures of the write process when the cache memory has no vacancy.

In the storage system of this embodiment, at the time of writing the data, which is transmitted from the terminal device (e.g., the terminal device 400a) via the networks 30 and 40, into the storage device (e.g., the storage device 200a), if the data cannot be written into the cache memory due to, e.g., lack of a vacant capacity of the cache memory (e.g., the cache memory 1021b), the data write process is executed through the procedures described below. It is here assumed, as in the case of FIG. 12, that the storage device 200a and the cache memory 1021b are assigned to the storage node 100a.

[Step S350] The terminal device 400a transmits the data, which is to be written into the storage device 200a, to the storage node 100a via the networks 30 and 40.

[Step S321] Upon receiving the data transmitted from the terminal device 400a to be written into the storage device 200a, the storage node 100a writes the received data into the cache memory 1021b.

[Step S332] If the writing of the data transmitted from the terminal device 400a into the cache memory 1021b cannot be performed, a write disability response for notifying the disability of the data writing is transmitted to the storage node 100a. This process is executed by the storage node 100b which includes the cache memory 1021b.

[Step S323] Upon receiving the write disability response, the storage node 100a transmits the data transmitted from the terminal device 400a to the storage device 200a for writing the data into the storage device (disk) 200a.

[Step S344] The storage device 200a stores (writes), in a HDD included therein, the data transmitted from the terminal device 400a. When the data writing is completed, the storage device 200a transmits a write completion response to the storage node 100a.

[Step S325] Upon receiving the write completion response in step S344, the storage node 100a transmits the write completion response to the terminal device 400a.

[Step S326] If there is any data which has been written into the cache memory 1021b in step S321, the storage node 100a erases that data from the cache memory 1021b.

[Step S337] When the data having been written into the cache memory 1021b is erased in step S326, a data erasure completion response is transmitted to the storage node 100a upon the completion of the data erasure. As in step S332, this erasure process is executed by the storage node 100b which includes the cache memory 1021b.

In this embodiment, as described above, at the time of writing the data, which is transmitted from the terminal device 400a, into the storage device 200a, if the data cannot be written into the cache memory 1021b due to, e.g., deficiency of its vacant capacity, the storage node 100a directly writes the data into the storage device 200a without writing it into the cache memory 1021b. In other words, when the data cannot be backed up in the cache memory 1021b, the storage node 100a writes the data into the storage device 200a in a synchronous manner.

Figure 14:
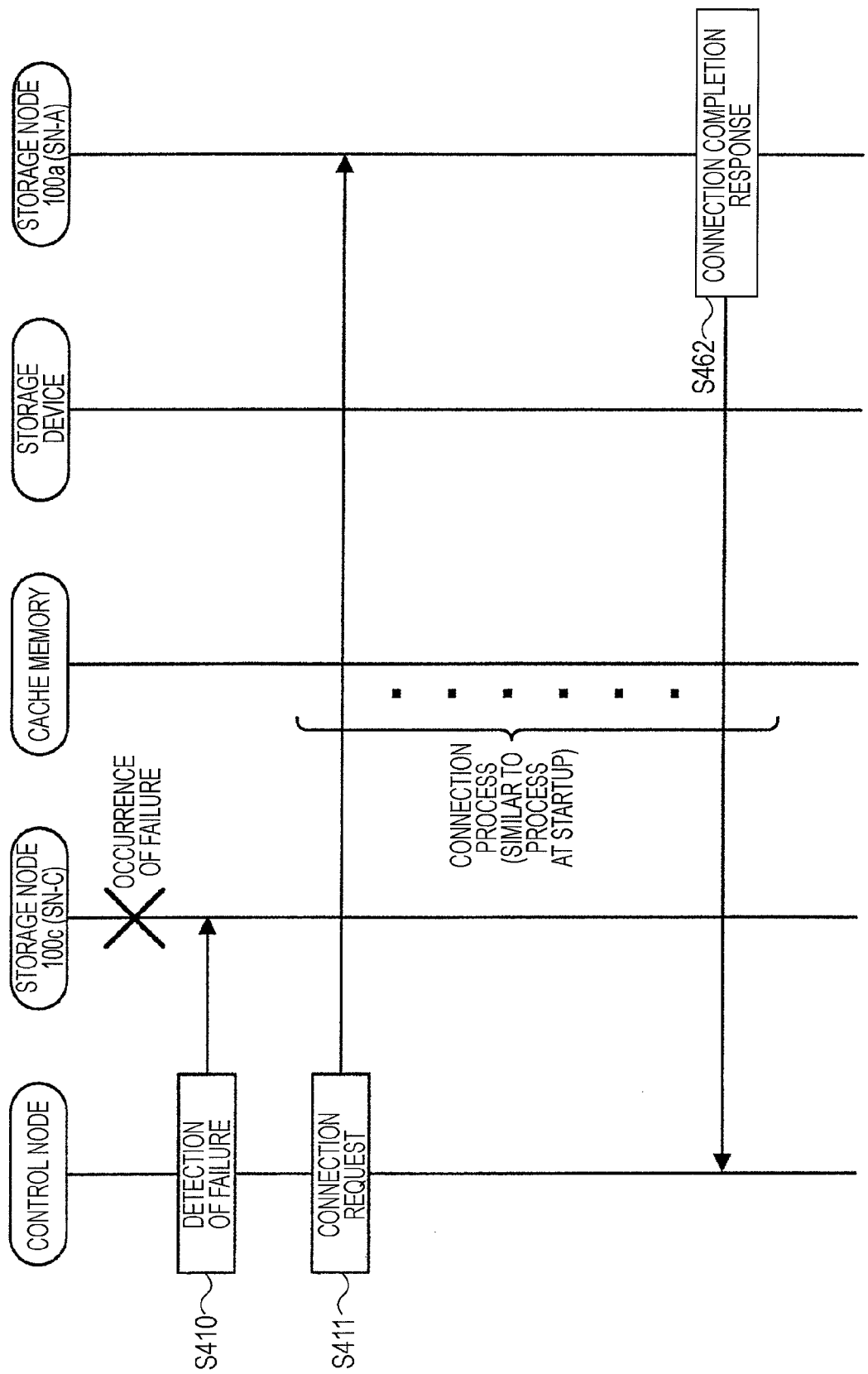
FIG. 14 is a sequence chart showing the procedures of the assignment process when the storage node has failed.

An assignment process in the event of a failure of the storage node will be described below which is executed as an assignment process in the storage system of this embodiment when the storage node has failed. FIG. 14 is a sequence chart showing the procedures of the assignment process executed when the storage node has failed.

In the event of a failure of the storage node in this embodiment, when the failure of the storage node is detected by the control node, the storage device and the cache memory which have been assigned to the failed storage node are assigned to the alternative storage node. Stated another way, the control node reassigns the storage device and the cache memory to the normal storage node. Correspondingly, the normal storage node is exclusively connected to the reassigned storage device and cache memory.

With reference to FIG. 14, the following description is made in connection with the case that, when the storage node (e.g., the storage node 100c) has failed, the storage device (e.g., the storage device 200a) and the cache memory (e.g., the cache memory 1021b), which have been so far assigned to the failed storage node 100c, are assigned by the currently operating control node (e.g., the control node 500a) to, instead of the failed storage node 100c, the storage node (e.g., the storage node 100a) to which another not-shown storage device and another not-shown cache memory are assigned. It is here assumed that the cache memory 1021b is arranged in the RAM 102b which is included in the storage node 100b. Further, it is assumed that the storage node 100a to be substituted for the failed storage node 100c is already operated in the storage system and is assigned to the other storage device and the other cache memory.

Procedures from step S411 (connection request) to step S462 (connection completion response) in the assignment process in the event of a failure of the storage node are the same as those in the startup assignment process in FIG. 11. Therefore, the illustration and the description regarding details of the procedures from step S411 to step S462 are omitted here.

[Step S410] The control node 500a detects a failure of the storage node 100c. The control node 500a periodically transmits a heart beat so that it can detect a failure of any of the storage nodes constituting the storage system upon break-off of a corresponding response to the heart beat.

[Step S411] Upon detecting the failure of the storage node 100c in step S410, the control node 500a notifies, via the network 30, the storage node 100a of the fact that the storage device 200a and the cache memory 1021b are now assigned to the storage node 100a which is substituted for the failed storage node 100c, and issues a connection request for the corresponding connection. Then, the startup assignment process is executed as described above with reference to FIG. 11.

[Step S462] When the connection of the assigned storage device 200a and cache memory 1021b to the storage node 100a is completed, the storage node 100a transmits a connection completion response to the control node 500a.

In this embodiment, as described above, the storage node 100a to be substituted for the failed storage node 100c is assigned to the other storage device and the other cache memory. In other words, the storage device 200a and the cache memory 1021b are further assigned to the storage node 100a which is already assigned to the other storage device and the other cache memory. However, the assignment method is not limited to that described in this embodiment. A standby storage node may be arranged in the storage system so that, in the event of a failure of the currently used storage node, the storage device and the cache memory which have been so far assigned to the failed storage node may be assigned to the standby storage node.

Further, one of the storage nodes constituting the storage system of this embodiment, which has a minimum load, may be automatically selected by the control node 500a as the storage node 100a to be substituted for the failed storage node 100c. In that case, for example, the frequency of data reading/writing may be used as a parameter for evaluating the load of each storage node. The frequency of data reading/writing may be represented by the number of accesses or by the amount of data having been read/written during the latest certain time. As another example of the parameter for evaluating the load of each storage node, the magnitude of capacity of the assigned storage device may also be used.

In the storage system of this embodiment, as described above, in the event of a failure of the storage node 100c, when the control node 500a detects the failure of the storage node 100c, the control node 500a newly assigns the storage device 200a and the cache memory 1021b to the storage node 100a. Also, if there is not-yet-written data which is stored in the cache memory 1021b, but which is not yet written into the storage device 200a at the timing of the assignment of the storage device 200a and the cache memory 1021b to the storage node 100a, the storage node 100a to which the storage device 200a and the cache memory 1021b are newly assigned reads the not-yet-written data from the cache memory 1021b and writes it into the storage device 200a (see FIG. 11).

Figure 15:
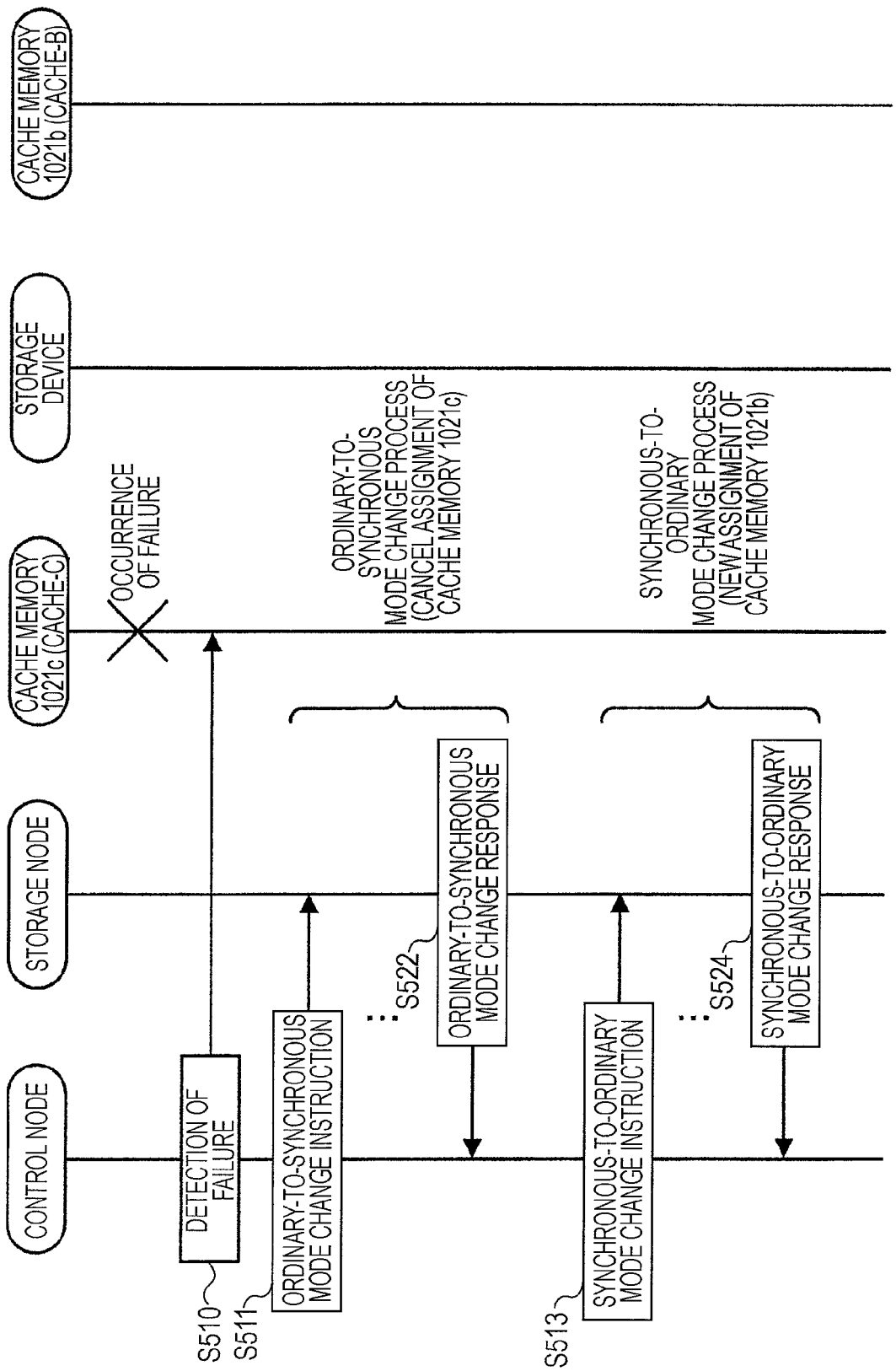
FIG. 15 is a sequence chart showing the procedures of the assignment process when the cache memory has failed.

An assignment process in the event of a failure of the cache memory will be described below which is executed as an assignment process in the storage system of this embodiment when the cache memory has failed. FIG. 15 is a sequence chart showing the procedures of the assignment process executed when the cache memory has failed.

In the event of a failure of the cache memory in the storage system of this embodiment, when the failure of the cache memory is detected by the control node, an alternative cache memory is assigned to the storage node, to which the failed cache memory has been so far assigned, along with the storage device which has been so far assigned to the same storage node. In other words, the control node exclusively assigns the storage device and the normal cache memory to the storage node to which the failed cache memory has been so far assigned. Correspondingly, that storage node is connected to the assigned normal cache memory.

With reference to FIG. 15, the following description is made in connection with the case that, when some cache memory (e.g., the cache memory 1021c) has failed, another normal cache memory (e.g., the cache memory 1021b) is assigned, instead of the failed cache memory, to the storage node (e.g., the storage node 100a) to which the failed cache memory has been so far assigned, in addition to the storage device (e.g., the storage device 200a) which is already assigned to the relevant storage node. It is here assumed that the cache memory 1021b is arranged in the RAM 102b which is included in the storage node 100b. Similarly, the cache memory 1021c is arranged in the RAM 102c which is included in the storage node 10c. Further, it is assumed that the cache memory 1021b is already operated in the storage system and is assigned to another not-shown storage node along with another not-shown storage device.

Procedures from step S511 (ordinary-to-synchronous mode change instruction) to step S522 (ordinary-to-synchronous mode change response) (i.e., cancellation of assignment of the failed cache memory 1021c) in the assignment process in the event of a failure of the cache memory will be described in detail later as an ordinary-to-synchronous mode change process with reference to FIG. 16. Also, procedures from step S513 (synchronous-to-ordinary mode change instruction) to step S524 (synchronous-to-ordinary mode change response) (i.e., new assignment of the normal cache memory 1021b) will be described in detail later as a synchronous-to-ordinary mode change process with reference to FIG. 18.

[Step S510] The control node 500a detects a failure of the cache memory 1021c. More specifically, the control node 500a communicates with each storage node to periodically monitor whether a write process to each cache memory has succeeded or failed. The control node 500a collects, via communication, the results of monitoring whether the write process from each storage node to the corresponding cache memory has succeeded or failed. The control node 500a can detect the failure of each of the cache memories constituting the storage system by checking whether a preset determination condition, e.g., "if the write process to a particular cache memory has failed successively over a predetermined number of times, that cache memory is regarded as being failed", is satisfied.

[Step S511] Upon detecting the failure of the cache memory 1021c in step S510, the control node 500a transmits an ordinary-to-synchronous mode change instruction to the storage node 100a, to which the failed cache memory 1021c has been so far assigned, for changing from the ordinary mode to the synchronous mode in which data is written without using the cache memory. The change from the ordinary mode to the synchronous mode will be described in detail later as the ordinary-to-synchronous mode change process with reference to FIG. 16.

[Step S522] When the ordinary-to-synchronous mode change process (see FIG. 16) is completed, the storage node 100a transmits an ordinary-to-synchronous mode change response to the control node 500a.

[Step S513] Upon receiving the ordinary-to-synchronous mode change response in step S522, the control node 500a transmits a synchronous-to-ordinary mode change instruction to the storage node 100a, to which the failed cache memory 1021c has been so far assigned, for changing from the synchronous mode to the ordinary mode in which data is written by using the normal cache memory 1021b for backup. A process of performing the change from the synchronous mode to the ordinary mode will be described in detail later as the synchronous-to-ordinary mode change process with reference to FIG. 18.

[Step S524] When the synchronous-to-ordinary mode change process (see FIG. 18) is completed, the storage node 100a transmits a synchronous-to-ordinary mode change response to the control node 500a.

In this embodiment, as described above, it is assumed that the cache memory 1021b is already operative in the storage system and is assigned to another not-shown storage node along with another not-shown storage device. In other words, the cache memory 1021b which has already been assigned to the other not-shown storage node is further assigned to the storage node 100a. However, the assignment method is not limited to that described in this embodiment. A standby cache memory may be arranged in the storage system so that, in the event of a failure of the currently used cache memory, the standby cache memory may be assigned to the storage node to which the failed cache memory has been so far assigned.

Alternatively, one of the cache memories constituting the storage system, which has a minimum load, may be automatically selected by the control node 500a as the cache memory 1021a to be substituted for the failed cache memory 1021c. In that case, for example, the frequency of data reading/writing with respect to the cache memory may be used as a parameter for evaluating the load of each cache memory. The frequency of data reading/writing may be represented by the number of times of accesses or by the amount of data having been read/written during the latest certain time. As another example of the parameter for evaluating the load of each cache memory, an average value of vacant capacity of the cache memory during a certain time may also be used.

In the storage system of this embodiment, as described above, when the control node 500a detects a failure of the cache memory 1021c, the control node 500a transmits the ordinary-to-synchronous mode change instruction to the storage node 100a, to which the failed cache memory 1021c has been so far assigned. Upon receiving the ordinary-to-synchronous mode change instruction, the storage node 100a executes the ordinary-to-synchronous mode change process (see FIG. 16) for changing from the ordinary mode, which requires the cache memory in writing data into the storage device 200a, to the synchronous mode, which does not require the cache memory in writing data into the storage device 200a, such that the data can be written without using the failed cache memory 1021c.

Then, the control node 500a newly assigns the cache memory 1021b to the storage node 100a and transmits the synchronous-to-ordinary mode change instruction to the storage node 100a. When the storage node 100a is assigned with the cache memory 1021b and receives the synchronous-to-ordinary mode change instruction, the storage node 100a executes, subsequent to the completion of the ordinary-to-synchronous mode change process, the synchronous-to-ordinary mode change process (see FIG. 18) for changing from the synchronous mode to the ordinary mode, which employs the newly assigned cache memory 1021b, such that data can be written while the data is backed up in the newly assigned cache memory 1021b.

The ordinary-to-synchronous mode change process will be described below. This process is executed in the storage system of this embodiment as a process of performing the change from the ordinary mode, which requires the cache memory in writing data into the storage device, to the synchronous mode, which does not require the cache memory in writing data into the storage device. FIG. 16 is a sequence chart showing the procedures of the process of performing the change from the ordinary mode to the synchronous mode.

In the storage system of this embodiment, in the event of a failure of the cache memory, when the failure of the cache memory is detected by the control node, the ordinary-to-synchronous mode change instruction is transmitted from the control node to the storage node, to which the failed cache memory has been so far assigned, for disconnection of the failed cache memory from the relevant storage node and for changing to the synchronous mode which does not require the cache memory in writing data into the storage device. Upon receiving the ordinary-to-synchronous mode change instruction, the storage node executes a process of writing data into the storage device without using the failed cache memory.

Figure 16:
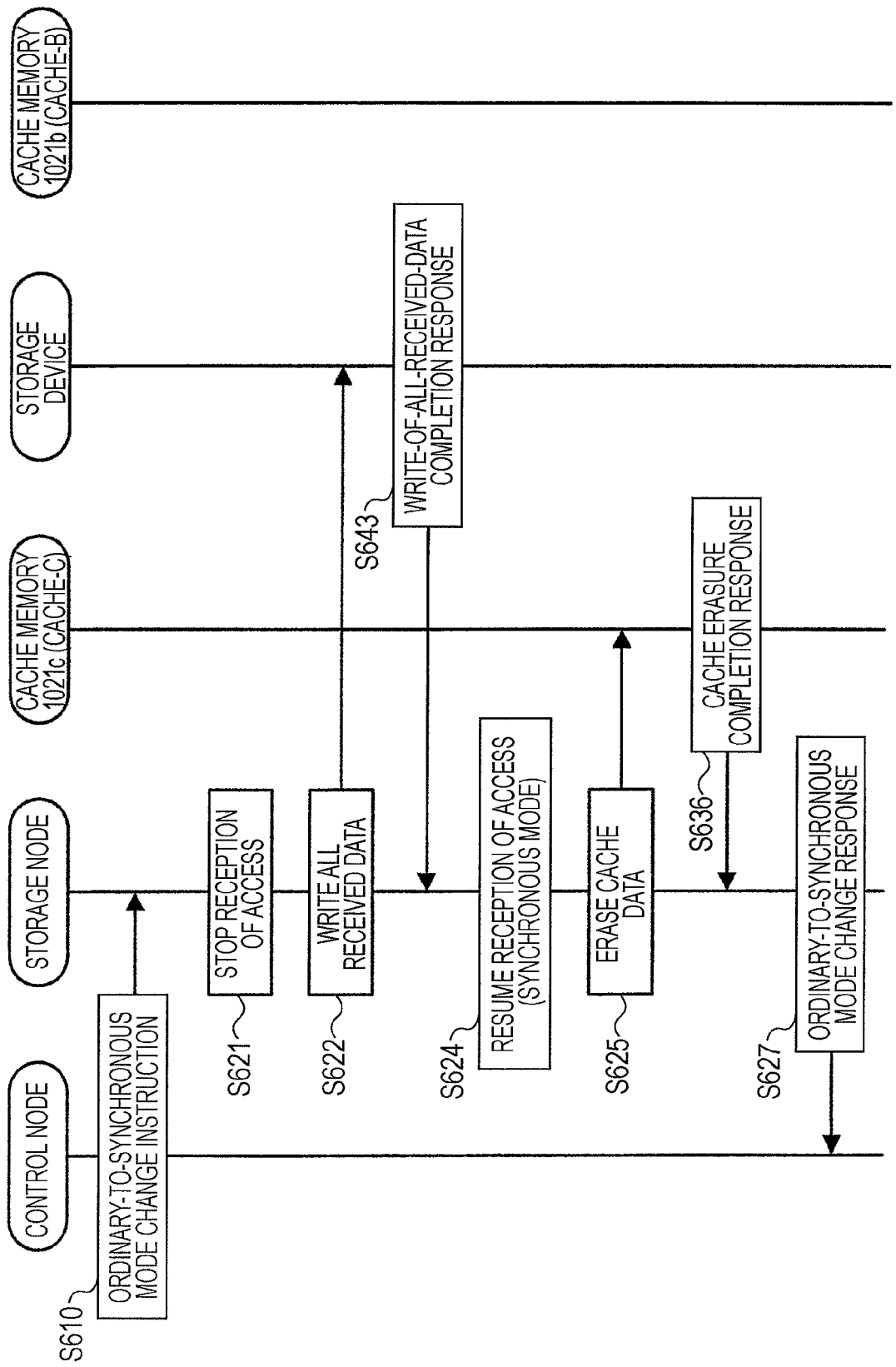
FIG. 16 is a sequence chart showing the procedures of a process of performing change from the ordinary mode to a synchronous mode.

With reference to FIG. 16, the following description is made in connection with the case where the currently operating control node (e.g., the control node 500a) cancels, for the storage node (e.g., the storage node 100a) to which the failed cache memory (e.g., the cache memory 1021c) has been so far assigned, the assignment of the failed cache memory 1021c thereto and changes the operation mode to the synchronous mode in which data is written into the storage device 200a without using the cache memory.

It is here assumed that the cache memory 1021b is arranged in the RAM 102b which is included in the storage node 100b. Similarly, the cache memory 1021c is arranged in the RAM 102c which is included in the storage node 100c. Further, it is assumed that the cache memory 1021b is already operating in the storage system and is assigned to another not-shown storage node along with another not-shown storage device. In addition, it is assumed that the cache memory 1021c is assigned to the storage node 100a in a corresponding relation to the storage device 200a until the cache memory 1021c fails, and data to be written into the storage device 200a is written into the cache memory 1021c for backup until the writing of the data into the storage device 200a is completed.

[Step S610] Upon detecting the failure of the cache memory 1021c in step S510 of FIG. 15, the control node 500a transmits, as in step S511 of FIG. 15, the ordinary-to-synchronous mode change instruction to the storage node 100a, to which the failed cache memory 1021c has been so far assigned, for changing to the synchronous mode in which data is written without using the cache memory.

[Step S621] Upon receiving the ordinary-to-synchronous mode change instruction transmitted from the control node 500a, the storage node 100a executes a process of stopping reception of access made on the storage device 200a which is assigned to the storage node 100a along with the failed cache memory 1021c. In other words, that process temporarily stops access, from the terminal device 400a to 400c, etc., to data (i.e., reading/writing of data) stored in the storage device 200a which is set in the corresponding relation to the cache memory 1021c and is assigned to the storage node 100a. When access to the data stored in the storage device 200a is tried from the terminal devices 400a to 400c during a period until the stop of access is canceled and the access is resumed, an error response is transmitted to the terminal device that tried the access.

[Step S622] If data to be written into the storage device 200a is stored in the RAM 102a arranged in the storage node 100a, the storage node 100a transmits all the data stored in the RAM 102a to the storage device 200a to be directly written into the storage device 200a without writing it into the cache memory.

[Step S643] The storage device 200a stores (writes), in the HDD included therein, the data transmitted from the storage node 100a in step S622. When the data writing is completed, the storage device 200a transmits a write-of-all-received-data completion response to the storage node 100a.

[Step S624] Upon receiving the write-of-all-received-data completion response in step S643, the storage node 100a executes a process of resuming the reception of access made on the storage device 200a. Correspondingly, access to the storage device 200a from the terminal devices 400a to 400c, etc. is resumed. As a result, access to the data stored in the storage device 200a from the terminal devices 400a to 400c, etc. is enabled. After that point in time, data transmitted from the terminal devices 400a to 400c to be written into the storage device 200a is written in the synchronous mode. If there is no written data in step S622, the process of resuming the reception of access is also executed in a similar manner.

[Step S625] If any data remains in the cache memory 1021c, the storage node 100a executes a cache erasure process of erasing the remaining data. When access to the cache memory 1021c is not allowed or the data in the cache memory 1021c cannot be erased depending on a failed condition, for example, the cache erasure process of erasing the data is not executed.

[Step S636] When the data having remained in the cache memory 1021c is completely erased, a cache erasure completion response is transmitted to the storage node 100a. This erasure process is executed by the storage node 100c which includes the cache memory 1021c.

[Step S627] When the above-described process of performing the change from the ordinary mode to the synchronous mode is completed, the storage node 100a transmits the ordinary-to-synchronous mode change response to the control node 500a.

In the storage system of this embodiment, as described above, the operation mode of the storage node 100a is temporarily changed to the synchronous mode through the ordinary-to-synchronous mode change process of performing the change from the ordinary mode, which requires the cache memory in writing data into the storage device 200a, to the synchronous mode which does not require the cache memory in writing data into the storage device 200a. As a result, the data is synchronously directly written into the storage device 200a according to a synchronous write process, which is described later with reference to FIG. 17, without using the failed cache memory 1021c.

Figure 17:
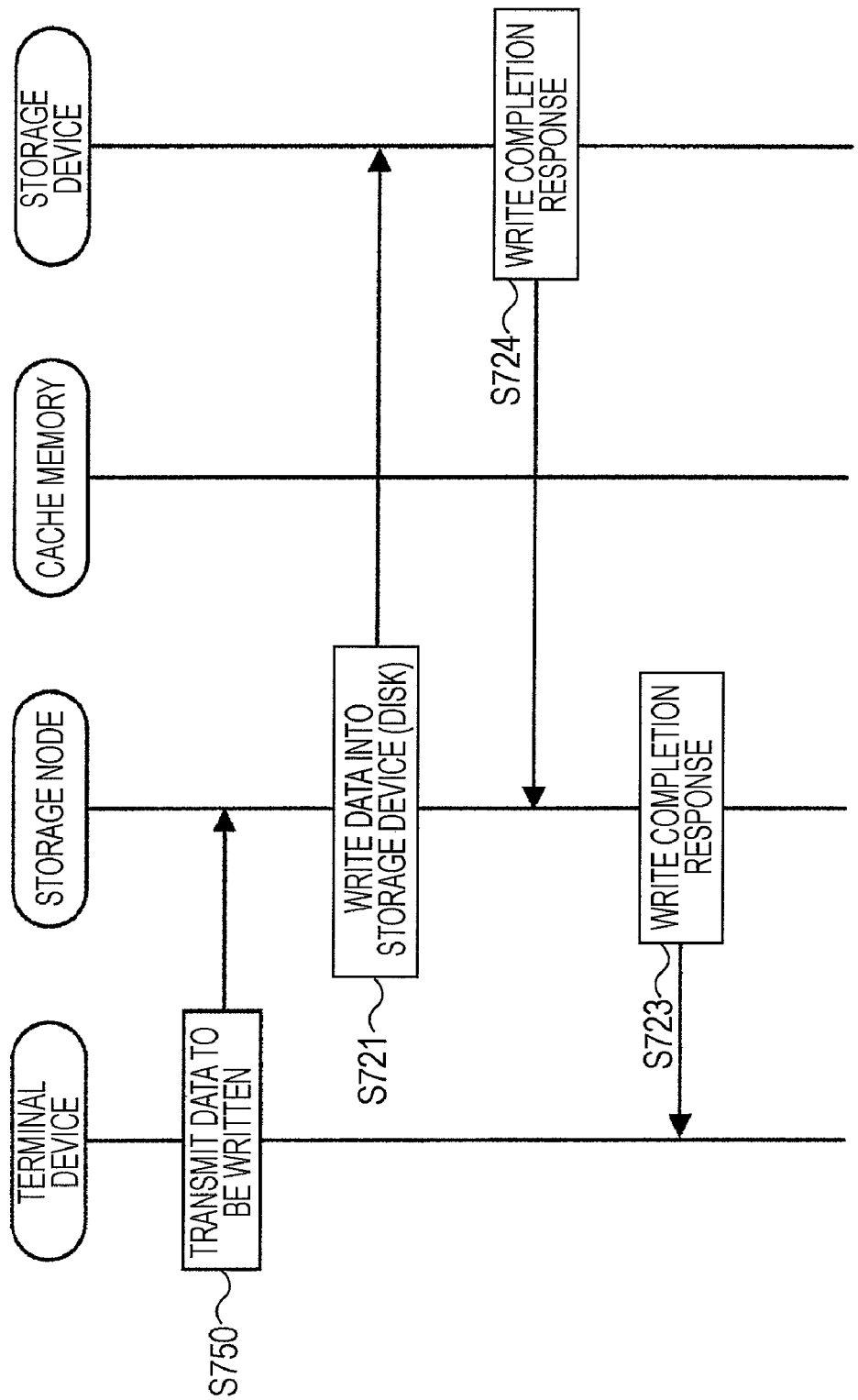
FIG. 17 is a sequence chart showing the procedures of a synchronous write process executed by the storage node.

The synchronous write process which will be described below is executed in the storage system of this embodiment as a process in which the storage node directly writes data transmitted from the terminal device into the storage device without writing it in the cache memory for backup. FIG. 17 is a sequence chart showing the procedures of the synchronous write process executed by the storage node.

In the storage system of this embodiment, if the cache memory fails, the operation mode of the storage node is changed to the synchronous mode which does not require the cache memory in writing data into the storage device. In the synchronous mode, the storage node directly writes the data transmitted from the terminal device into the storage device without using the cache memory.

As illustrated in FIG. 17, the process of directly writing data transmitted from the terminal device (e.g., the terminal device 400a) via the networks 30 and 40 into the storage device (e.g., the storage device 200a) is executed through procedures described below. It is here assumed that the cache memory 1021b is assigned to the storage node 100a along with the storage device 200a.

[Step S750] The terminal device 400a transmits the data, which is to be written into the storage device 200a, to the storage node 10a via the networks 30 and 40.

[Step S721] Upon receiving the data transmitted from the terminal device 400a to be written into the storage device 200a, the storage node 100a transmits the received data to the storage device 200a for directly writing it into the storage device (disk) 200a.

[Step S742] The storage device 200a stores (writes), in the HDD included therein, the data transmitted from the terminal device 400a. When the data writing is completed, the storage device 200a transmits a write completion response to the storage node 100a.

[Step S723] Upon receiving the write completion response in step S742, the storage node 100a transmits the write completion response to the terminal device 400a.

In this embodiment, as described above, when the storage node 100a writes the data transmitted from the terminal device 400a into the storage device 200a in the synchronous mode, the data is directly written into the storage device 200a without using the cache memory.

Further, when the writing of the data, which has been transmitted from the terminal device 400a to the storage device 200a, is completed, the storage node 100a transmits the write completion response to the terminal device 400a. Accordingly, the data transmitted from the terminal device 400a is released from the write process on the side including the terminal device 400a after the data writing into the storage device 200a is completed. Stated another way, in the synchronous mode, the writing of the data transmitted from the terminal device 400a into the storage device 200a is processed in a synchronous manner.

Figure 18:
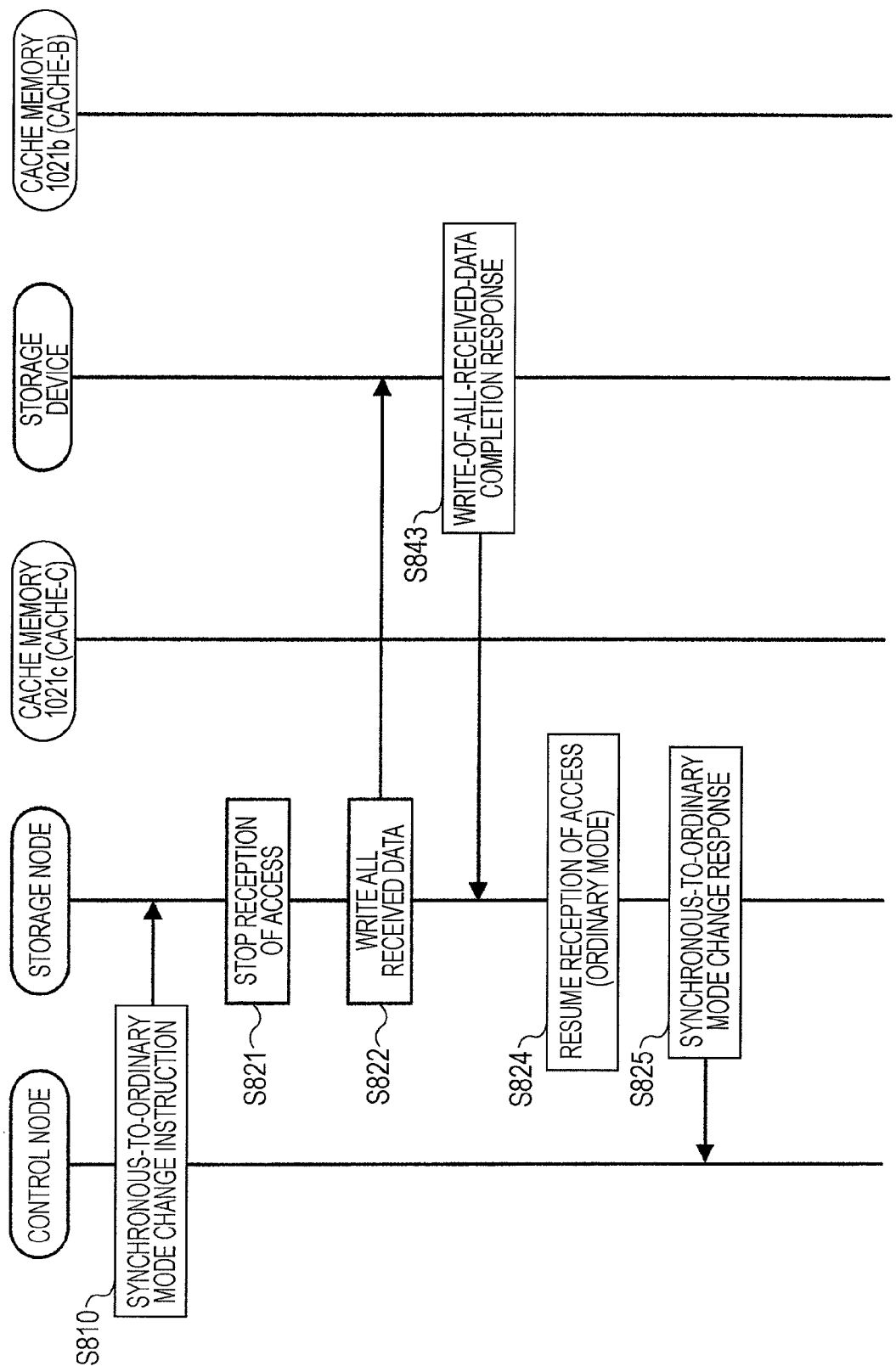
FIG. 18 is a sequence chart showing the procedures of a process of performing change from the synchronous mode to the ordinary mode.

The synchronous-to-ordinary mode change process which will be described below is executed in the storage system of this embodiment as a process of performing the change from the synchronous mode, in which data is not backed up when the data is written into the storage device, to the ordinary mode, in which data is backed up in the cache memory when the data is written into the storage device. FIG. 18 is a sequence chart showing the procedures of the process of performing the change from synchronous mode to the ordinary mode.

In the storage system of this embodiment, in the event of a failure of the cache memory, when the failure of the cache memory is detected by the control node, the operation mode is temporarily changed to the synchronous mode which does not require the cache memory in writing data into the storage device, and the storage node executes the process of writing the data into the storage device without using the failed cache memory. Then, the control node assigns a new normal cache memory other than the failed cache memory to the storage node to which the failed cache memory has been so far assigned. Subsequently, the control node transmits the synchronous-to-ordinary mode change instruction to the storage node to which the new normal cache memory is assigned, for changing to the ordinary mode again in which the data to be written into the storage device is backed up by using the cache memory. Upon receiving the synchronous-to-ordinary mode change instruction, the storage node executes the process of writing the data into the storage device while backing it up in the normal cache memory newly assigned.

With reference to FIG. 18, the following description is made in connection with the following case. When the currently operating control node (e.g., the control node 500a) assigns, to the storage node (e.g., the storage node 100a) to which the failed cache memory (e.g., the cache memory 1021c) has been so far assigned, another normal cache memory (e.g., the cache memory 1021b) to be substituted for the failed cache memory 1021c, the operation mode is changed to the ordinary mode in which data is written into the storage device 200a while the data is backed up in the newly assigned cache memory 1021b.

It is here assumed that the cache memory 1021b is arranged in the RAM 102b which is included in the storage node 100b. Similarly, the cache memory 1021c is arranged in the RAM 102c which is included in the storage node 100c. Further, it is assumed that the cache memory 1021b is already operated in the storage system and is assigned to another not-shown storage node along with another not-shown storage device. In addition, it is assumed that the cache memory 1021c is assigned to the storage node 100a in a corresponding relation to the storage device 200a until the cache memory 1021c fails, and data to be written into the storage device 200a is written into the cache memory 1021c for backup until the writing of the data into the storage device 200a is completed.

[Step S810] Upon receiving the ordinary-to-synchronous mode change response in step S522 of FIG. 15, the control node 500a transmits, as in step S513 of FIG. 15, the synchronous-to-ordinary mode change instruction to the storage node 100a, to which the failed cache memory 1021c has been so far assigned, for changing to the ordinary mode again in which data is written while the normal cache memory 1021b is used to back up the data.

[Step S821] Upon receiving the synchronous-to-ordinary mode change instruction transmitted from the control node 500a, the storage node 100a executes a process of stopping reception of access made on the storage device 200a into which data has been written in the synchronous mode. With that process, access to data (i.e., reading/writing of data) stored in the storage device 200a, which is going to be changed to the ordinary mode, from the terminal devices 400a to 400c, etc. is temporarily stopped. When access to the data stored in the storage device 200a is tried from the terminal devices 400a to 400c before the stop of access is canceled and access is resumed, an error response is transmitted to the terminal device having tried the access.

[Step S822] If data to be written into the storage device 200a is stored in the RAM 102a arranged in the storage node 100a, the storage node 100a transmits all the data stored in the RAM 102a to the storage device 200a to be directly written into the storage device 200a without writing it into the cache memory.

[Step S843] The storage device 200a stores (writes), in the HDD included therein, the data transmitted from the storage node 100a in step S822. When the data writing is completed, the storage device 200a transmits a write-of-all-received-data completion response to the storage node 100a.

[Step S824] Upon receiving the write-of-all-received-data completion response in step S843, the storage node 100a executes a process of resuming the reception of access made on the storage device 200a. Correspondingly, access to the storage device 200a from the terminal devices 400a to 400c, etc. is resumed. As a result, the access to the data stored in the storage device 200a from the terminal devices 400a to 400c, etc. is enabled. After that point in time, data transmitted from the terminal devices 400a to 400c to be written into the storage device 200a is written in the ordinary mode. If there is no written data in step S822, the process of resuming the reception of access is also executed in a similar manner.

[Step S825] When the above-described process of performing the change from the synchronous mode to the ordinary mode is completed, the storage node 100a transmits a synchronous-to-ordinary mode change response to the control node 500a.

Thus, when the control node 500a detects the failure of the cache memory 1021c, it transmits the ordinary-to-synchronous mode change instruction to the storage node 100a for instructing the change to the synchronous mode. When the control node 500a receives the ordinary-to-synchronous mode change response indicating that the change to the synchronous mode in the storage node 100a has been completed, it newly assigns the normal cache memory 1021b to the storage node 100a and transmits the synchronous-to-ordinary mode change instruction to the storage node 100a for instructing the change to the ordinary mode.

Thus, when the storage node 100a receives the synchronous-to-ordinary mode change instruction transmitted from the control node 500a, it responsively changes the operation mode to the ordinary mode in which data is stored in the cache memory 1021b when the data is written into the storage device 200a. On the other hand, when the storage node 100a receives the ordinary-to-synchronous mode change instruction transmitted from the control node 500a, it responsively changes the operation mode to the synchronous mode in which data is written into the storage device 200a without storing the data in any cache memory.

In the storage system of this embodiment, as described above, the operation mode of the storage node 100a is changed to the ordinary mode again through the synchronous-to-ordinary mode change process of performing the change from the synchronous mode in which data is not backed up in any cache memory in writing the data into the storage device, to the ordinary mode in which data is backed up in the cache memory in writing the data into the storage device. As a result, the data is asynchronously written into the storage device through the ordinary write process, shown in FIG. 12, while the data is backed up in the newly assigned cache memory 1021b.

Figure 19:
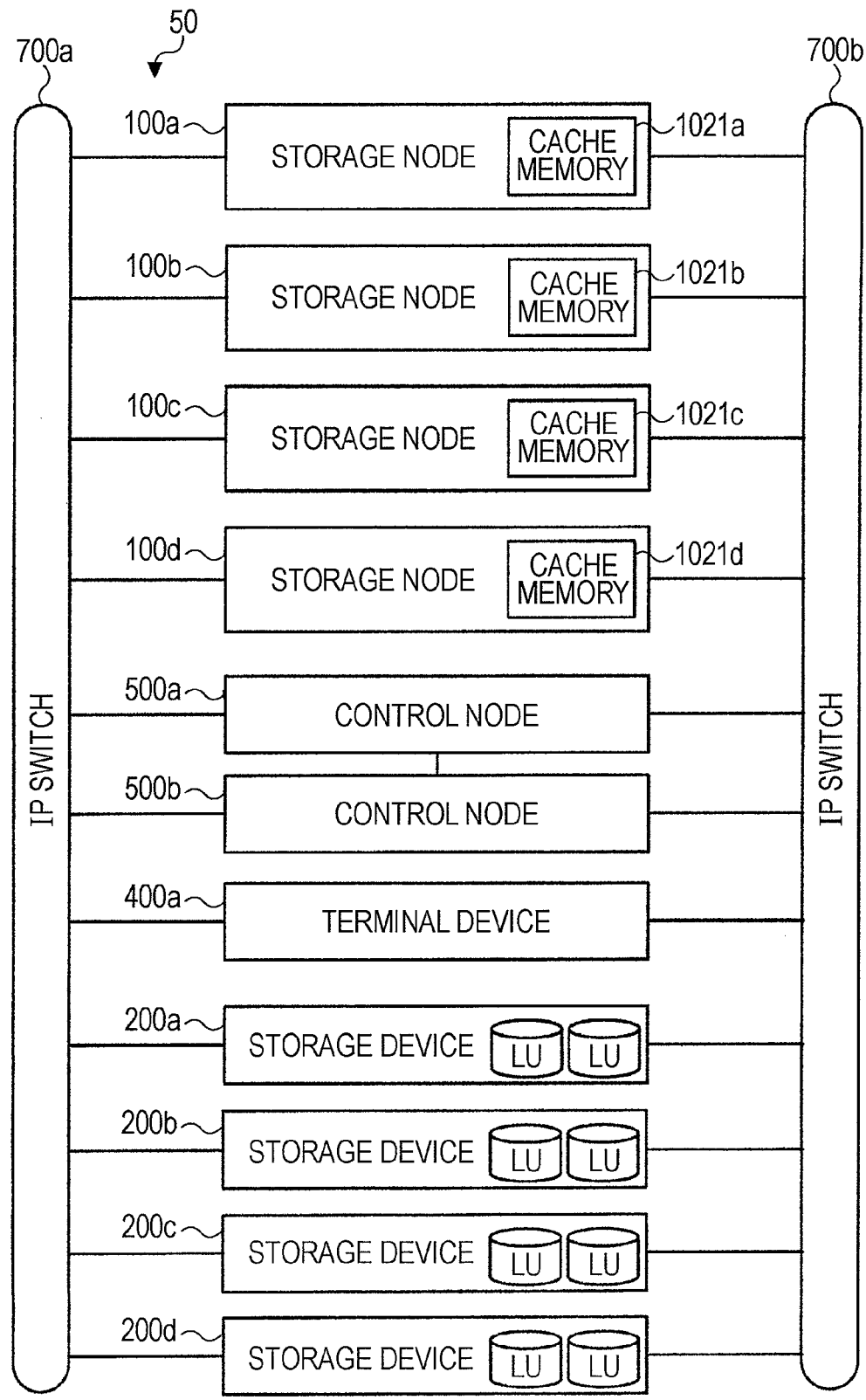
FIG. 19 is a block diagram showing an exemplary configuration of the storage system according to the embodiment.

A practical example of the configuration of the storage system according to this embodiment will be described below. FIG. 19 is a block diagram showing an exemplary configuration of the storage system according to the embodiment. In the exemplary configuration of the storage system shown in FIG. 19, the storage node includes the cache memory for temporarily storing data to be written into the storage device, and the storage device is constituted by a disk array device.

The storage system according to this embodiment, which has the exemplary configuration shown in FIG. 19, includes a plurality (e.g., four) of storage nodes $100a$, $100b$, $100c$ and $100d$, a plurality (e.g., four) of storage devices $200a$, $200b$, $200c$ and $200d$, at least one control node, e.g., two control nodes $500a$ and $500b$, and at least one (e.g., one) terminal device $400a$, which are interconnected via a network $50$ through IP switches $700a$ and $700b$.

The storage nodes $100a$ to $100d$, the control nodes $500a$ and $500b$, and the terminal device $400a$ are constituted by computers which are interconnected via the network $50$ based on IP (Internet Protocol).

The storage nodes $100a$ to $100d$, the control nodes $500a$ and $500b$, the terminal device $400a$, and the storage devices $200a$ to $200d$ have each two network interfaces (not shown). Those two network interfaces are connected to the IP switches $700a$ and $700b$ so that each path is constituted in dual redundancy.

The storage devices $200a$ to $200d$ are connected respectively to the storage nodes $100a$ to $100d$ via the network $50$ by using iSCSI (Internet Small Computer System Interface). The storage nodes $100a$ to $100d$ manage data stored in respective logical units in the storage devices $200a$ to $200d$ which are assigned by the control nodes $500a$ and $500b$, and further provide the data under the management to the terminal device $400a$ via the network $50$.

In addition, the storage nodes $100a$ to $100d$ provide, to the terminal device $400a$, information processing service utilizing the data stored in the storage devices $200a$ to $200d$ which are managed respectively by the storage nodes $100a$ to $100d$. Stated another way, each of the storage nodes $100a$ to $100d$ executes a predetermined program in response to a request transmitted from the terminal device $400a$ via the network $50$ and then executes reading/writing of data and transmission/reception of data in response to requests from the terminal device $400a$.

More specifically, upon receiving a data read request from the terminal device $400a$ via the network $50$, each of the storage nodes $100a$ to $100d$ reads the requested data from one of the storage devices $200a$ to $200d$ which is assigned to the relevant storage node, and then makes a response to the terminal device $400a$ having transmitted the read request. Also, upon receiving a data write request from the terminal device $400a$ via the network $50$, each of the storage nodes $100a$ to $100d$ writes the data into one of the storage devices $200a$ to $200d$ which is assigned to the relevant storage node. When the writing of the data is completed, each of the storage nodes $100a$ to $100d$ makes a response to the terminal device $400a$ for indicating the completion of the data writing.

The storage nodes $100a$ to $100d$ include cache memories $1021a$ to $1021d$, respectively. Further, the storage nodes $100a$ to $100d$ include respective cache servers (not shown) capable of writing, reading, and erasing data transmitted from the terminal device $400a$ with respect to the cache memories $1021a$ to $1021d$.

Each of the cache servers causes corresponding storage nodes $100a$ to $100d$ to transmit and receive data to and from another one of the storage nodes $100a$ to $100d$ to which the cache memory included in the former one storage node is assigned, to write the received data into the cache memory which is included in the former one storage node, and to transmit data read out from the cache memory which is included in the former one storage node.

The cache memories $1021a$ to $1021d$ are assigned to the storage nodes $100a$ to $100d$ by the control nodes $500a$ and $500b$. On that occasion, each of the cache memories $1021a$ to $1021d$ is assigned to one of the storage nodes $100a$ to $100d$ other than the storage node including the relevant cache memory.

For example, the cache memory $1021a$ is not assigned to the storage node $100a$ including the cache memory $1021a$, and it is assigned to one of the storage nodes $100b$ to $100d$ other than the storage node $100a$. Speaking conversely, the cache memory other than the cache memory $1021a$, i.e., one of the cache memories $1021b$ to $1021d$ which is included in one of the storage nodes $100b$ to $100d$ other than the storage node $100a$, is assigned to the storage node $100a$.

Each of the cache memories $1021a$ to $1021d$ stores, for backup, data that is transmitted from assigned one of the storage nodes and is written into corresponding one of the storage devices $200a$ to $200d$.

With the arrangement described above, for example, when the storage device $200a$ and the cache memory $1021b$ are assigned to the storage node $100a$, data loss can be avoided even if the storage node $100a$ fails. Stated another way, by completely writing, into the cache memory $1021b$, data which is already transmitted from the terminal device $400a$ to the storage node $100a$, but which is not yet completely written into the storage device $200a$, the data is not lost even with the failure of the storage node $100a$.

In comparison with the case where the cache memory is included in the storage node which executes the process of writing data into the relevant cache memory, therefore, an advantage can be obtained in avoiding data loss caused by a failure of the relevant storage node.

The control nodes $500a$ and $500b$ are computers for managing the storage nodes $100a$ to $100d$ and the storage devices $200a$ to $200d$. The control nodes $500a$ and $500b$ in this embodiment assign respective logical units to the storage nodes $100a$ to $100d$. Further, the control nodes $500a$ and $500b$ assign, to one of the storage nodes $100a$ to $100d$, one of the cache memories $1021a$ to $1021d$ which is included in another one of the storage nodes $100a$ to $100d$ except for the former one.

In addition, the control nodes $500a$ and $500b$ acquire information regarding data management from the storage nodes $100a$ to $100d$ and update the information as required.

For example, the control nodes $500a$ and $500b$ hold, in the form of a connection state table, the setting of assignment of the storage devices $200a$ to $200d$ and the cache memories $1021a$ to $1021d$ to the storage nodes $100a$ to $100d$. When the assignment is set at the startup, or when the assignment is changed with, e.g., reassignment upon detection of a failure, the control nodes $500a$ and $500b$ update the connection state table and record the latest assignment setting therein.

To increase reliability, the control nodes $500a$ and $500b$ are constituted in dual redundancy and are interconnected to mutually confirm their live states by using a mutual monitoring system such that one control node can detect an abnormality, e.g., a failure, of the other control node. Further, one (e.g., $500a$) of the control nodes $500a$ and $500b$ is a currently operating system and is operated in the usual state, and the other (e.g., the control node $500b$) is a standby system and is held standby in the usual state. For example, when the control node $500a$ serving as the currently operating system has failed, the control node $500b$ maintained as the standby system is operated instead of the control node $500a$ to succeed the processing executed by the control node $500a$.

When the storage system is started up, the control nodes 500a and 500b assign the storage devices 200a to 200d and the cache memories 1021a to 1021d to the storage nodes 100a to 100d.

Further, the control nodes 500a and 500b can detect a failure of the storage nodes 100a to 100d and a failure of the cache memories. Upon detecting a failure of the storage nodes 100a to 100d, the control nodes 500a and 500b newly assign the storage device and the cache memory, which have been so far assigned to the failed storage node, to another storage node.

The storage devices 200a to 200d are each a disk array device which is constituted by a plurality of HDDs based on RAID5, and they have respective logical units (LUs). The storage nodes to which the logical units of the storage devices 200a to 200d are respectively assigned can exclusively access the assigned logical units.

Only the storage node assigned by the control nodes 500a and 500b can exclusively access corresponding storage devices 200a to 200d via the network 50.

The storage devices 200a to 200d are not limited to RAID5 and they may be constituted by using another type of RAID. As an alternative, a disk array of the storage device may be constituted by using another suitable technique other than RAID. Further, the storage devices 200a to 200d may be each constituted by a single hard disk without using a disk array, or another suitable storage device.

The terminal device 400a is a computer operated by a user of the storage system. The user of the storage system can access the storage nodes 100a to 100d and can perform reading/writing of data stored in the storage devices 200a to 200d by operating the terminal device 400a.

Figure 20:
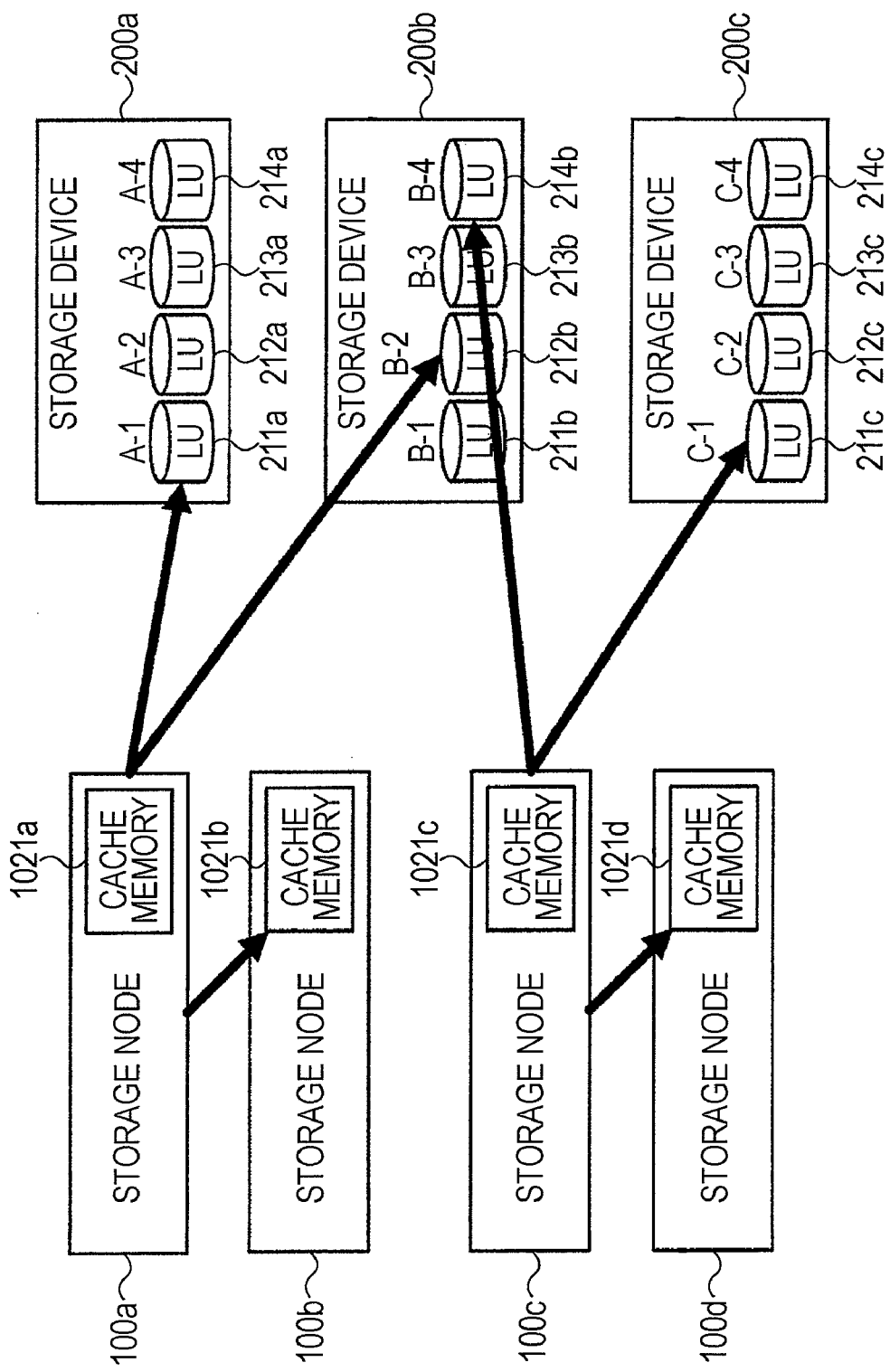
FIG. 20 illustrates the assignment setting in the exemplary configuration of the storage system according to the embodiment in a usual state.
Figure 21:
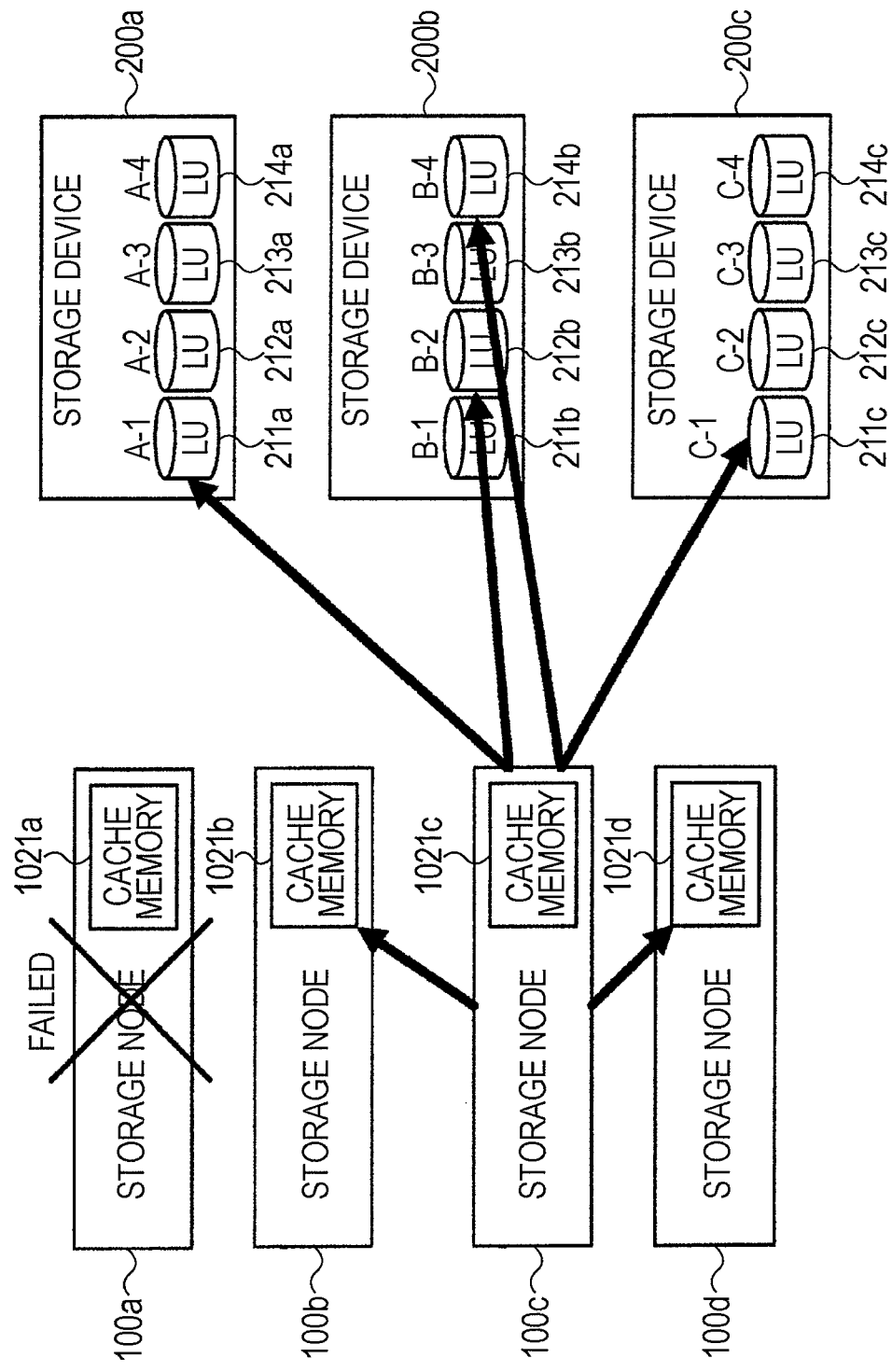
FIG. 21 illustrates the assignment setting in the exemplary configuration of the storage system according to the embodiment when the storage node has failed.

Assignment settings in the exemplary configuration of the storage system will be described below which are employed in the usual state and when the storage node has failed. FIG. 20 illustrates the assignment setting in the exemplary configuration of the storage system according to the embodiment in the usual state. FIG. 21 illustrates the assignment setting in the exemplary configuration of the storage system according to the embodiment when the storage node has failed.

As shown in FIGS. 20 and 21, the storage nodes 100a to 100d include respective cache servers operating with the cache memories 1021a to 1021d. The storage device 200a includes logical units 211a, 212a, 213a and 214a (also indicated by A-1 to A-4 in the drawings). Similarly, the storage device 200b includes logical units 211b to 214b (also indicated by B-1 to B-4 in the drawings), and the storage device 200c includes logical units 211c to 214c (also indicated by C-1 to C-4 in the drawings).

In FIG. 20, the storage node 100a is connected to the cache memory 1021b included in the cache server of the storage node 100b, to the logical unit 211a of the storage device 200a, and to the logical unit 212b of the storage device 200b. Also, the storage node 100c is connected to the cache memory 1021d included in the cache server of the storage node 100d, to the logical unit 214b of the storage device 200b, and to the logical unit 211c of the storage device 200c.

In the event of a failure of the storage node 10a, as shown in FIG. 21, the cache memory 1021b, the logical unit 211a of the storage device 200a, and the logical unit 212b of the storage device 200b, which have been so far assigned to the storage node 100a, are assigned to, e.g., the storage node 100c by the currently operating control node 500a. With such assignment, when the terminal device 400a accesses, for example, data stored in the logical unit 212b of the storage device 200b, the storage node 100c succeeds the processing having been executed by the storage node 100a and executes the process of writing and reading data into and from the storage device 200b. The above description is similarly applied to the logical unit 211a.

Change of the connection state in the exemplary configuration of the storage system will be described below by referring to connection state tables. FIGS. 22A and 22B illustrate respective connection state tables in the exemplary configuration of the storage system according to the embodiment when the storage system is in the usual state and when the storage node has failed.

A connection state table 560 shown in FIG. 22A and a connection state table 570 shown in FIG. 22B are each a table storing connection state information that indicates the connection state of the storage nodes, the storage devices, and the cache memories in the storage system. The connection state tables 560 and 570 are prepared and managed by the control node 500a serving as the currently operating system and the control node 500b maintained as the standby system. The connection state information stored in the connection state tables 560 and 570 is updated by the currently operating control node 500a, as required, when the storage system is started up and when the assignment is changed due to a failure, etc. The same table is also stored in the standby control node 500b and is updated as required. In FIGS. 22A and 22B, "SN-A" to "SN-C" denote the storage nodes 100a to 100c, respectively. Also, "LU-A-1" denotes the logical unit 211a. Similarly, "LU-B-2" denotes the logical unit 212b, "LU-B-4" denotes the logical unit 214b, and "LU-C-1" denotes the logical unit 211c.

Each of the connection state tables 560 and 570 has a column of "storage node name" indicating respective names of the storage nodes arranged in the storage system, a column of "storage (logical unit) name" indicating respective names of the logical units of the storage devices arranged in the storage system, and a column of "cache device name" indicating respective names of the cache memories arranged in the storage system. Items of the information lying horizontally in the three columns are correlated with one another to provide the connection state information representing the logical unit and the cache memory which are assigned to the storage node.

For example, the top row of the connection state table 560 in FIG. 22A indicates that the logical unit 211a (logical unit name "LU-A-1") and the cache memory 1021b (cache device name "CACHE-B") are assigned to the storage node 100a (storage node name "SN-A"). Similarly, the second top row of the connection state table 560 indicates that the logical unit 212b (logical unit name "LU-B-2") and the cache memory 1021b (cache device name "CACHE-B") are assigned to the storage node 100a (storage node name "SN-A").

Also, the top row of the connection state table 570 in FIG. 22B indicates that the logical unit 211a (logical unit name "LU-A-1") and the cache memory 1021b (cache device name "CACHE-B") are assigned to the storage node 100c (storage node name "SN-C"). Similarly, the second top row of the connection state table 570 of FIG. 22 indicates that the logical unit 212b (logical unit name "LU-B-2") and the cache memory 1021b (cache device name "CACHE-B") are assigned to the storage node 100c (storage node name "SN-C").

The following is understood from FIGS. 22A and 22B. Before the storage node 100a fails, the assignment is set in the connection state table 560 such that, as shown in FIG. 22A, the logical units 211a and 212b and the cache memory 1021b are assigned to the storage node 100a. After the storage node 100a has failed, the assignment of the logical units 211a and 212*b* and the cache memory 1021*b* to the storage node 100*c* is reflected in the connection state table 570 as shown in FIG. 22B.

By using the storage system described above, in the event of a failure of the storage nodes 100*a* to 100*d*, data not yet written into the storage devices 200*a* to 200*d* is passed to another normal storage node and is written into the storage devices 200*a* to 200*d* because the data is backed up in corresponding one of the cache memories 1021*a* to 1021*d*. Therefore, data loss can be avoided. Other data having been already written into the storage devices 200*a* to 200*d* by the failed storage node is passed to the other normal storage node through reassignment of the storage devices 200*a* to 200*d* and the cache memories 1021*a* to 1021*d*, which is performed by the control nodes 500*a* and 500*b* having detected the failure. Accordingly, the operation of the storage system can be maintained continuously.

Further, in the ordinary mode, data is backed up in one of the cache memories 1021*a* to 1021*d* by writing the data in an asynchronous manner. More specifically, in the ordinary mode, the writing of data from the terminal device 400*a* is executed such that the data is temporarily stored in the cache memory 1021*b* and the completion of this process is then indicated to the terminal device 400*a* without waiting for the completion of the writing into the storage device 200*a*. As a result, a quicker response to the terminal devices 400*a* to 400*d* can be obtained in spite of backing up the data.

The storage nodes 100*a* to 100*d* in this embodiment not only perform backup of the data having been written into the storage devices 200*a* to 200*d* and management of the storage device and the cache memory which are newly assigned thereto, but also execute the process of usually writing data into the storage devices 200*a* to 200*d* by themselves. However, the functional arrangement is not limited to that described above in the embodiment. For example, the process of usually writing data into the storage devices 200*a* to 200*d* may be executed by another device, and the storage nodes 100*a* to 100*d* may just perform backup of the written data and management of the storage device and the cache memory which are newly assigned thereto, without executing the process of usually writing data into the storage devices 200*a* to 200*d*.

Modification of this Embodiment

Figure 23:
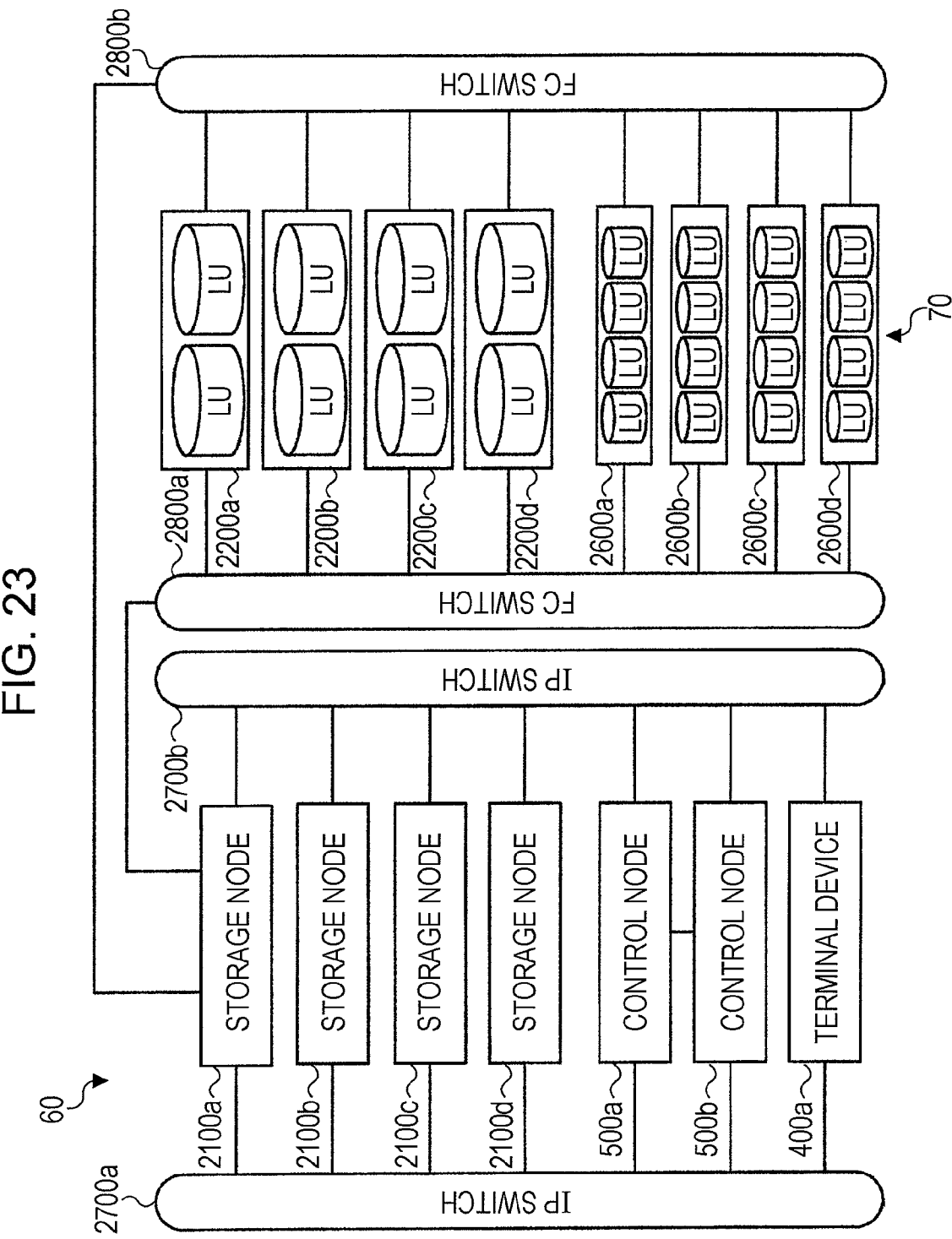
FIG. 23 is a block diagram showing an exemplary configuration of a storage system according to a modification of the embodiment.

A modification of this embodiment will be described below with reference to the drawing. The difference between the above-described embodiment and the modification is described primarily regarding the difference from the exemplary configuration shown in FIG. 19. Similar components to those in FIG. 19 are denoted by the same characters. The storage system according to the modification of this embodiment differs in that two types of the storage devices are prepared and used separately. More specifically, the storage system of the modification includes main storage devices for storing data, and backup storage devices serving as cache devices, instead of the cache memories, which back up the data written into the main storage devices. Another difference is that the main storage devices and the backup storage devices are interconnected by using a fiber channel (FC) to constitute a storage area network (SAN). FIG. 23 is a block diagram showing an exemplary configuration of the storage system according to the modification of this embodiment.

The storage system according to the modification of this embodiment, shown in FIG. 23, includes a plurality (e.g., four) of storage nodes 2100*a*, 2100*b*, 2100*c* and 2100*d*, at least one control node, e.g., two control nodes 500*a* and 500*b*, and at least one (e.g., one) terminal device 400*a*, which are interconnected via a network 60 through IP switches 2700*a* and 2700*b*.

Further, a plurality (e.g., four) of main storage devices 2200*a*, 2200*b*, 2200*c* and 2200*d*, and a plurality (e.g., four) of backup storage devices 2600*a*, 2600*b*, 2600*c* and 2600*d* are interconnected via a fiber channel (FC) through FC switches 2800*a* and 2800*b*, thereby constituting a SAN 70. The storage node 2100*a* is connected to the FC switches 2800*a* and 2800*b* of the SAN 70. Though not shown, the other storage nodes 2100*b* to 2100*d* are each also connected to the FC switches 2800*a* and 2800*b* of the SAN 70 similarly to the storage node 2100*a*.

The storage nodes 2100*a* to 2100*d*, the control nodes 500*a* and 500*b*, and the terminal device 400*a* are constituted by computers which are interconnected via the network 60 based on IP (Internet Protocol).

The storage nodes 2100*a* to 2100*d*, the control nodes 500*a* and 500*b*, and the terminal device 400*a* have each two network interfaces (not shown). Those two network interfaces are connected to the IP switches 2700*a* and 2700*b* so that each path is constituted in dual redundancy.

Also, each of the storage nodes 2100*a* to 2100*d* has two HBAs (host bus adaptors) (not shown). Those HBAs are connected to the FC switches 2800*a* and 2800*b* so that the connection to the SAN 70 is constituted in dual redundancy.

The HBAs are interface controllers for connecting the SAN 70 to the storage nodes 2100*a* to 2100*d*. In this embodiment, the SAN 70 made up of the main storage devices 2200*a* to 2200*d*, the backup storage devices 2600*a* to 2600*d*, etc. is connected to the storage node 2100*a* to 2100*d* via the fiber channel.

With the above-described arrangement, the storage nodes 2100*a* and 2100*d* can read and write data from and into the main storage devices 2200*a* to 2200*d* and the backup storage devices 2600*a* to 2600*d*, which constitute the SAN 70. More specifically, the storage nodes 2100*a* to 2100*d* manage data stored in the logical units of the main storage devices 2200*a* to 2200*d* which are assigned thereto by the control nodes 500*a* and 500*b*, and provide the data under the management to the terminal device 400*a* via the network 60.

In addition, the storage nodes 2100*a* to 2100*d* provide, to the terminal device 400*a*, information processing service utilizing the data stored in the main storage devices 2200*a* to 2200*d* which are managed respectively by the storage nodes 2100*a* to 2100*d*. Stated another way, each of the storage nodes 2100*a* to 2100*d* executes a predetermined program in response to a request transmitted from the terminal device 400*a* via the network 60 and then executes reading/writing of data and transmission/reception of data in response to the request from the terminal device 400*a*.

More specifically, upon receiving a data read request from the terminal device 400*a* via the network 60, each of the storage nodes 2100*a* to 2100*d* reads the requested data from one of the main storage devices 2200*a* to 2200*d*, which is assigned to the relevant storage node, through the HBA of the relevant storage node and the FC switches 2800*a* and 2800*b*, and then makes a response to the terminal device 400*a* having transmitted the read request. Also, upon receiving a data write request from the terminal device 400*a* via the network 60, each of the storage nodes 2100*a* to 2100*d* writes the data into one of the main storage devices 2200*a* to 2200*d*, which is assigned to the relevant storage node, through the fiber channel and the FC switches 2800*a* and 2800*b*. When the writing of the data is completed, each of the storage nodes 2100*a* to 2100*d* makes a response to the terminal device 400*a* for indicating the completion of the data writing.

The control nodes 500a and 500b are computers for managing the storage nodes 2100a to 2100d, the main storage devices 2200a to 2200d, the backup storage devices 2600a to 2600d. More specifically, the control nodes 500a and 500b in this embodiment assign the logical units of the main storage devices 2200a to 2200d to the storage nodes 2100a to 2100d. Further, the control nodes 500a and 500b assign the logical units of the backup storage devices 2600a to 2600d to the storage nodes 2100a to 2100d in order to temporarily store data for backup when the data is written into the main storage devices 2200a to 2200d.

In addition, the control nodes 500a and 500b acquire information regarding data management from the storage nodes 2100a to 2100d and update the information as required.

More specifically, each of the control nodes 500a and 500b holds, in the form of, e.g., a connection state table, the setting of assignment of the main storage devices 2200a to 2200d and the backup storage devices 2600a to 2600d to the storage nodes 2100a to 2100d. When the assignment is performed at the startup, or when the assignment is updated with new assignment upon, e.g., detection of a failure, the control nodes 500a and 500b update the connection state table and record the latest assignment setting.

To increase reliability, the control nodes 500a and 500b are constituted in dual redundancy and are interconnected to mutually confirm their live states by using a mutual monitoring system such that one control node can detect an abnormality, e.g., a failure, of the other control node. Further, one (e.g., 500a) of the control nodes 500a and 500b is a currently operating system and is operated in the usual state, and the other (e.g., the control node 500b) is a standby system and is held standby in the usual state. For example, when the control node 500a serving as the currently operating system has failed, the control node 500b maintained as the standby system is operated instead of the control node 500a to succeed the processing executed by the control node 500a.

When the storage system is started up, the control nodes 500a and 500b assign the main storage devices 2200a to 2200d and the backup storage devices 2600a to 2600d to the storage nodes 2100a to 2100d.

Further, the control nodes 500a and 500b can detect a failure of the storage nodes 2100a to 2100d and a failure of the backup storage devices 2600a to 2600d. Upon detecting a failure of the storage nodes 2100a to 2100d, the control nodes 500a and 500b newly assign the storage device and the high-speed storage device, which have been so far assigned to the failed storage node, to another storage node.

The terminal device 400a is a computer operated by a user of the storage system. The user of the storage system can access the storage nodes 2100a to 2100d and can perform reading/writing of data stored in the storage devices by operating the terminal device 400a.

The SAN 70 is a network interconnecting the storage devices, such as the main storage devices 2200a to 2200d and the backup storage devices 2600a to 2600d, via a large-capacity communication path, such as the fiber channel, so that high-speed data access can be performed. With the SAN 70, data can be transferred without exerting a processing load on a computer which tries to access the SAN 70. Accordingly, a large amount of data can be transferred with high efficiency by cooperation of servers with the SAN 70 used in a communication path.

The main storage devices 2200a to 2200d are each a disk array device having a plurality of built-in HDDs based on RAID5, and they have respective logical units (LU). The main storage devices 2200a to 2200d constitute the SAN 70 and are connected to the storage nodes 2100a to 2100d through iSCSI. The storage nodes to which the logical units of the main storage devices 2200a to 2200d and the logical units of the backup storage devices 2600a to 2600d are assigned can exclusively access the assigned logical units.

The main storage devices 2200a to 2200d are each preferably made of a large-capacity HDD, such as a SATA (Serial ATA (Advanced Technology Attachment)). Only the storage node assigned by the control nodes 500a and 500b can exclusively access corresponding ones of the main storage devices 2200a to 2200d.

In this modification, the main storage devices 2200a to 2200d provide disk management service of RAID5. The main storage devices 2200a to 2200d are not limited to RAID5 and they may be constituted by using another type of RAID. As an alternative, a disk array of the main storage device may be constituted by using another suitable technique other than RAID. Further, the main storage devices 2200a to 2200d may be each constituted by a single hard disk without using a disk array, or another suitable storage device.

Each of the main storage devices 2200a to 2200d has two fiber channel interfaces connected to the fiber channel. Those two fiber channel interfaces are connected to the FC switches 2800a and 2800b, respectively.

The backup storage devices 2600a to 2600d are each a disk array device of RAID5 which is constituted by interconnecting a plurality of disk devices via a fiber channel, and they have respective logical units (LU). A high-speed disk drive, e.g., a semiconductor disk or a SAS (Serial Attached SCSI), is preferably used as each of the backup storage devices 2600a to 2600d. The use of such a high-speed disk drive can constitute a high-speed disk array device and can increase the operation speed when data is backed up and recovered by the backup storage devices 2600a to 2600d in the storage system.

Each of the backup storage devices 2600a to 2600d has two fiber channel interfaces connected to the fiber channel. Those two fiber channel interfaces are connected to the FC switches 2800a and 2800b, respectively.

The backup storage devices 2600a to 2600d are assigned to the storage nodes 2100a to 2100d by the control nodes 500a and 500b. Further, the backup storage devices 2600a to 2600d store, for backup, data transmitted from the assigned storage nodes to be written into the main storage devices 2200a to 2200d.

With the arrangement described above, for example, when the main storage device 2200a and the backup storage device 2600a are assigned to the storage node 2100a, data loss can be avoided even if the storage node 2100a fails. Stated another way, by completely writing, into the backup storage device 2600a, data which is already transmitted from the terminal device 400a to the storage node 2100a, but which is not yet completely written into the main storage device 2200a, the data is not lost even with the failure of the storage node 2100a.

In comparison with the case where the backup storage device for temporarily backing up data at the time of writing the data into the storage device is included in the storage node which executes the process of writing the data into the relevant backup storage device, therefore, an advantage can be obtained in avoiding data loss caused by a failure of the relevant storage node.

The backup storage devices 2600a to 2600d used in the modification of this embodiment are not limited to RAID5 and they may be constituted by using another type of RAID. As an alternative, a disk array of the backup storage device may be constituted by using another suitable technique other than RAID. Further, the backup storage devices 2600a to 2600d may be each constituted by a single hard disk without using a disk array, or another suitable storage device.

Instead of the backup storage devices 2600a to 2600d in the modification of this embodiment, other cache devices such as cache memories are also usable. In such a case, the cache devices may be included in the storage nodes 2100a to 2100d as with the cache memories 1021a to 1021d in the above-described embodiment.

Also, while in the modification of this embodiment the SAN 70 is constituted by the main storage devices 2200a to 2200d and the backup storage devices 2600a to 2600d, the arrangement of the storage devices is not limited to the above-described modification. For example, the main storage devices 2200a to 2200d and the backup storage devices 2600a to 2600d may be connected to the storage nodes 2100a to 2100d via a network based on IP, as in the above-described embodiment, without using the SAN. Alternatively, the main storage devices 2200a to 2200d and the backup storage devices 2600a to 2600d may be constituted as separate SANs, i.e., a SAN made up of the main storage devices 2200a to 2200d and a SAN made up of the backup storage devices 2600a to 2600d. Further, instead of constituting both groups of the main storage devices 2200a to 2200d and the backup storage devices 2600a to 2600d as two SANs, only one group may be constituted as a SAN.

The thus-constructed storage system according to the modification can also realize similar operation and advantages to those obtained with the above-described embodiment.

While the storage management device, the storage system control device, the storage management program, and the storage system according to the present invention have been described in connection with the illustrated embodiment and modification, the above description merely explains the principle of the present invention. The present invention is not limited to constructions and application examples exactly as per illustrated and described above. The present invention can be modified and altered in various ways by those skilled in the art. Corresponding modifications and equivalents can be all included in the scope of the present invention, which is defined by attached claims and equivalents thereof, and individual components can be replaced with any other suitable ones having similar functions. Also, any other suitable components or steps may be added to the present invention. Further, the present invention may be implemented in a combination of two or more constituent elements (features) in the above-described embodiment and modification.

The above-described processing functions can be realized with computers. In such a case, programs are provided which describe processing details of the functions to be executed by the storage nodes 100a to 100d, the management node 300, the terminal devices 400a to 400c, and the control nodes 500a and 500b. The above-described processing functions are achieved with the computers by executing the programs in the computers.

The programs describing the processing details can be recorded on a computer readable recording medium. Examples of the computer readable recording medium include a magnetic recording device, an optical disk, a magneto-optical recording medium, and a semiconductor memory. The magnetic recording device may be, e.g., a HDD, a flexible disk (FD), or a magnetic tape (MT). The optical disk may be, e.g., a DVD (Digital Versatile Disk), a DVD-RAM, a CD-ROM (Compact Disc-Read Only Memory), or a CD-R (Recordable)/RW (ReWritable) disk. The magneto-optical recording medium may be, e.g., an MO (Magneto-Optical) disk.

For distributing the programs, a portable recording medium, such as a DVD or a CD-ROM, recording the program is put into a commercial market. Alternatively, the program may be stored in a server computer such that the program is transferred from the server computer to another computer via a network.

A computer executing the program loads, into its memory, the program recorded on the portable recording medium or the program transferred from the server computer. Then, the computer reads the program from its memory and executes processing in accordance with the program. The computer can also directly read the program from the portable recording medium and executes processing in accordance with the program. In addition, when the program is transferred from the server computer, the computer can execute processing in accordance with the program each time it receives the program.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage management device used in a storage system, which stores data in a plurality of storage devices interconnected via a network in a distributed manner, for managing the storage device, the storage management device comprising:

a management unit managing one of the storage devices assigned thereto and temporary storage unit assigned thereto, and a control unit for controlling the storage system by managing the storage management device;

the management unit comprising:

a backup unit, when the data is written into the storage device, storing the data in the previously assigned temporary storage unit before the writing of the data into the storage device is completed; and a take-over unit, when data which is already stored in the temporary storage unit, but which is not yet written into the storage device exists at timing the storage device and the temporary storage unit are assigned, writing the not-yet-written data into the storage device, the control unit comprising:

a failure detection unit detecting a failure of one of the plurality of storage devices and the temporary storage unit; and an assignment unit assigning the storage device and the temporary storage to the management unit, wherein when a failure is detected by the failure detection unit, the assignment unit assigns the storage device and the temporary storage unit which caused the failure to another management unit, and assigns another storage device and another temporary storage unit to the management unit, and wherein when the data which is already stored in the temporary storage unit, but which is not yet written into the storage device exists at timing the storage device and the temporary storage unit are assigned by the storage system control device, the take-over unit writes the not-yet-written data into the storage device.

2. The storage management device according to claim 1, wherein after the writing of the data into the storage device has been completed, the backup unit erases the data having been written into the temporary storage unit.

3. The storage management device according to claim 1, wherein when the data which is already stored in the temporary storage unit, but which is not yet written into the storage device exists at timing the storage device and the temporary storage unit are assigned, the take-over unit reads the not-yet-written data from the temporary storage unit and writes the not-yet-written data into the storage device.

4. The storage management device according to claim 1, further comprising internal storage unit for storing data not yet completely written when the data is written into the storage device,
wherein the backup unit stores the not-yet-written data in the internal storage unit before the writing of the data into the storage device is completed, and
wherein when data which is already stored in the internal storage unit, but which is not yet written into the storage device exists at timing the temporary storage unit is assigned, the take-over unit reads the data from the internal storage unit and writes the not-yet-written data into the storage device.

5. The storage management device according to claim 4, wherein after the writing of the data into the storage device has been completed, the backup unit erases the data having been written into the internal storage unit.

6. The storage management device according to claim 1, wherein, after the data writing into the temporary storage unit has been completed, but before the data writing into the storage unit has been completed, the backup unit outputs a write completion response notifying that the data writing into the temporary storage unit has been completed.

7. The storage management device according to claim 1, wherein, in accordance with an instruction from the storage system control device, the backup unit is able to, when the data is written into the storage device, selectively change between an ordinary mode in which the data is stored in the assigned temporary storage unit before completion of the data writing into the storage device, and a synchronous mode in which the data is written into the storage device without storing the data in the temporary storage unit.

8. The storage management device according to claim 1, wherein the storage management device includes the temporary storage unit therein.

9. The storage management device according to claim 8, wherein the temporary storage unit is assigned to the storage management device other than the storage management device which includes the temporary storage unit therein.

10. A storage system control device for controlling a storage system which stores data in a plurality of storage devices,
the storage system control device controlling the storage system by managing a storage management device which is capable of managing the storage device and capable of, when the data is written into the storage device, storing the data in a previously assigned temporary storage unit before the writing of the data into the storage device is completed,
the storage system control device comprising;
a failure detection unit for detecting a failure of the storage management device when the storage device or the temporary storage unit associated with the storage management device fails; and
an assignment unit for assigning the storage device and the temporary storage unit to the storage management device,
wherein when the failure of the storage management device is detected by the failure detection unit, the assignment unit assigns, to another storage management device, the storage device and the temporary storage unit, which have been assigned to the storage management device causing the failure detected by the failure detection failure, and assigns, to the storage management device, another storage device and another temporary storage unit.

11. The storage system control device according to claim 10, wherein the failure detection unit further detects a failure of the temporary storage unit, and
wherein when the failure of the temporary storage unit is detected by the failure detection unit, the assignment unit assigns another temporary storage unit to the storage management device to which the temporary storage unit causing the failure detected by the failure detection failure has been assigned.

12. The storage system control device according to claim 10, wherein the temporary storage unit is included in the storage management device, and
wherein when the temporary storage unit included in the storage management device is assigned to one storage management device including one temporary storage unit, the assignment unit assigns, to the one storage management device, the temporary storage unit included in the storage management device other than the one storage management device.

13. A recording medium storing a storage management program causing a computer to execute, in a storage system which stores data in a plurality of storage devices interconnected via a network in a distributed manner, a process of managing the storage device, the program causing:
the computer to function as management unit for managing one of the storage devices assigned thereto and temporary storage unit assigned thereto, and
the computer to function as a control unit for controlling the storage system by managing the storage management program;
the management unit to function as:
a backup unit, when the data is written into the storage device, storing the data in the previously assigned temporary storage unit before the writing of the data into the storage device is completed; and
a take-over unit, when data which is already stored in the temporary storage unit, but which is not yet written into the storage device exists at timing the storage device and the temporary storage means are assigned, writing the not-yet-written data into the storage device
the control unit to function as:
a failure detection unit detecting a failure of the storage device or the temporary storage unit assigned to the management unit; and
an assignment unit assigning the storage device and the temporary storage unit to the management unit, wherein when a failure is detected by the failure detection unit, the assignment unit assigns the storage device and the temporary storage unit which caused the failure to another management unit and assigns another storage device and another temporary storage unit to the management unit.

14. A storage system for storing data in a plurality of storage devices interconnected via a network in a distributed manner, the storage system comprising:
a storage management device including management means for managing one of the storage devices assigned thereto and temporary storage unit assigned thereto; and a storage system control device for controlling the storage system by managing the storage management device, the storage system control device comprising:

a failure detection unit for detecting a failure of the storage device assigned to the storage management device or the temporary storage unit assigned to the storage management device;

an assignment unit for assigning the storage device and the temporary storage unit to the storage management device, wherein when a failure is detected by the failure detection unit, the assignment unit assigns the storage device and the temporary storage unit which caused the failure to another storage management device and assigns another storage device and another temporary storage unit to the storage management device;

the management means comprising:

a backup unit for, when the data is written into the storage device, storing the data in the previously assigned temporary storage unit before the writing of the data into the storage device is completed; and a take-over unit for, when data which is already stored in the temporary storage unit, but which is not yet written into the storage device exists at timing the storage device and the temporary storage unit are assigned, writing the not-yet-written data into the storage device.

15. A data storing system comprising:

a first storage;

a first management apparatus;

a second management apparatus having a second storage; and a third management apparatus, wherein the first management apparatus includes a processor to control storing data, to be written into the first storage by the first management apparatus, in the second storage as backup data when the first and second storages are allocated to the first management apparatus;

the third management apparatus includes a processor to control storing data, to be written into the first storage by the third management apparatus, in the second storage as backup data when allocation of the first and second storages is switched from the first management apparatus to the third management apparatus in response to an occurrence of an error in the first management apparatus, wherein when the second management apparatus has data, which has not been written into the first storage, in the second storage, the processor of the third management apparatus controls to take over data writing to the first storage from the first management apparatus regarding the data which has not been written to the first storage.

16. A method for data storing method in a data storing system including a first storage, a first management apparatus, second management apparatus having a second storage, and third management apparatus, the method comprising:

controlling, by the first management apparatus, storing data in the first storage and storing the data in the second storage when the first and second storages are allocated to the first management apparatus;

controlling, by the third management apparatus, storing data in the first storage and storing the data in the second storage when allocation of the first and second storages is switched from the first management apparatus to the third management apparatus in response to an occurrence of an error in the first management apparatus; and when the second management apparatus has data, which has not been written into the first storage, in the second storage, taking over, by the third management apparatus, data writing to the first storage from the first management apparatus regarding the data which has not been written to the first storage.

* * * * *